United States Patent [19]
Albrecht et al.

[11] Patent Number: 5,583,872
[45] Date of Patent: Dec. 10, 1996

[54] HIGH SPEED DATA TRANSFER OVER TWISTED PAIR CABLING

[75] Inventors: Alan Albrecht, Rocklin; Steven H. Goody, Roseville, both of Calif.; Michael P. Spratt, Henleaze, United Kingdom; Joseph A. Curcio, Jr., Folsom; Daniel J. Dove, Applegate, both of Calif.

[73] Assignee: Hewlett-Packard Company, Palo Alto, Calif.

[21] Appl. No.: 388,872

[22] Filed: Feb. 10, 1995

Related U.S. Application Data

[62] Division of Ser. No. 972,694, Nov. 6, 1992.

[51] Int. Cl.$^6$ ................................................ H04L 12/40
[52] U.S. Cl. .................. 370/476; 371/37.1; 375/242; 375/260; 370/474; 370/401
[58] Field of Search ............... 370/85.1, 77, 85.9, 370/94.3, 100.1, 105.6, 105.5, 105.6, 108, 110.1, 107, 111; 371/37.1, 37.2, 37.6, 37.7, 42, 38.1, 46; 375/242, 246, 253, 256, 257, 259, 260, 262, 265, 365, 366, 367, 368; 380/8, 28, 31, 33, 37

[56] References Cited

U.S. PATENT DOCUMENTS

| | | | |
|---|---|---|---|
| Re. 33,380 | 10/1990 | Cheng-Quispe et al. | 375/220 |
| 4,457,004 | 6/1984 | Gersho et al. | 375/265 |
| 4,520,480 | 5/1985 | Kawai | 370/111 |
| 4,586,182 | 4/1986 | Gallagher | 375/242 |
| 4,630,286 | 12/1986 | Betts | 375/260 |
| 4,755,987 | 7/1988 | Lee et al. | 370/77 |
| 4,775,985 | 10/1988 | Busby | 375/242 |
| 4,775,987 | 7/1988 | Lee et al. | 370/77 |
| 4,941,154 | 7/1990 | Wei | 375/265 |
| 5,107,505 | 4/1992 | Lelandovis et al. | 371/37.6 |
| 5,115,453 | 5/1992 | Calderbank et al. | 375/265 |
| 5,119,402 | 6/1992 | Ginzburg et al. | 375/288 |
| 5,144,305 | 9/1992 | Götz et al. | 370/111 |

FOREIGN PATENT DOCUMENTS

| | | | |
|---|---|---|---|
| 0471945 | 6/1991 | Germany . | |
| 0495757 | 7/1992 | Netherlands | H04L 12/26 |
| WO81/03559 | 12/1981 | WIPO | G06F 3/00 |

*Primary Examiner*—Wellington Chin
*Assistant Examiner*—Huy D. Vu

[57] ABSTRACT

A method provides for a first network node in a plurality of network nodes to transmit a data packet to a hub. The hub and the network nodes are interconnected within a local network system. Control signals are exchanged between the first network node and the hub. The exchange of control signals is done in a first signal frequency range. A data packet is sent from the first network node to the hub. The data packet is sent using data signals within a second signal frequency range. The first signal frequency range and the second signal frequency range do not overlap.

15 Claims, 24 Drawing Sheets

| FIG. 5.A | FIG. 5.B |

FIG. 5

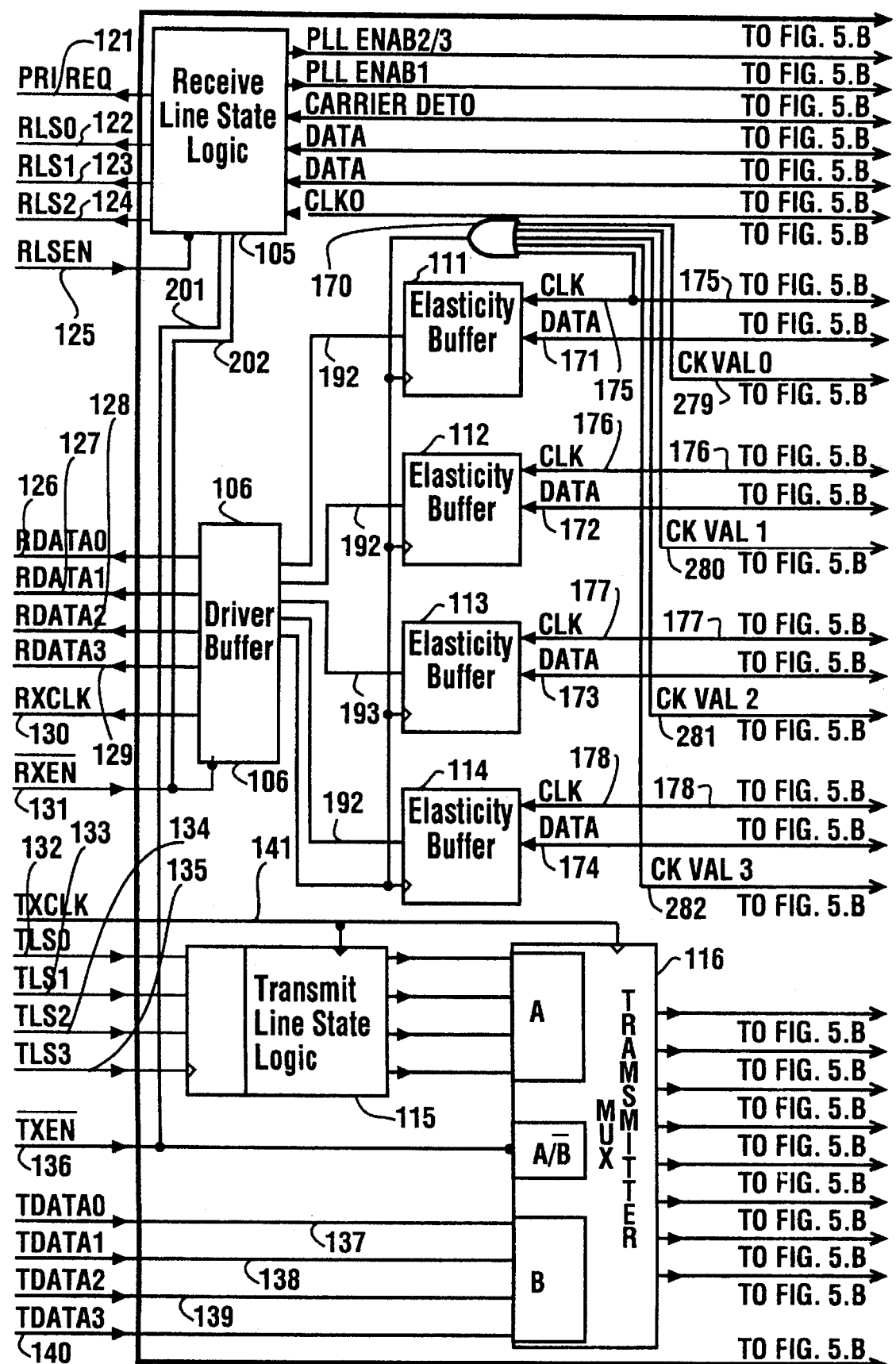
FIG. 5.A

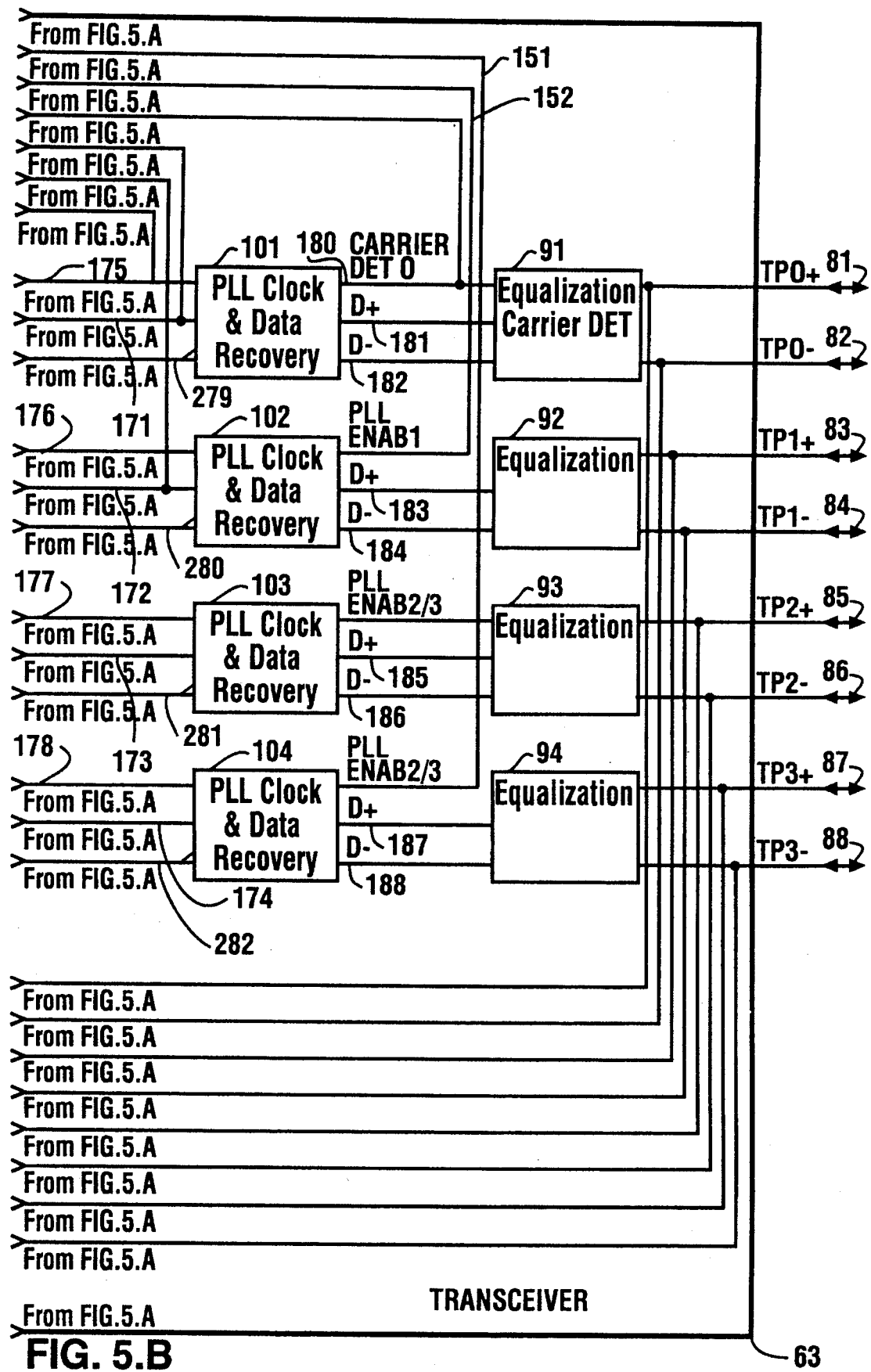
FIG. 5.B

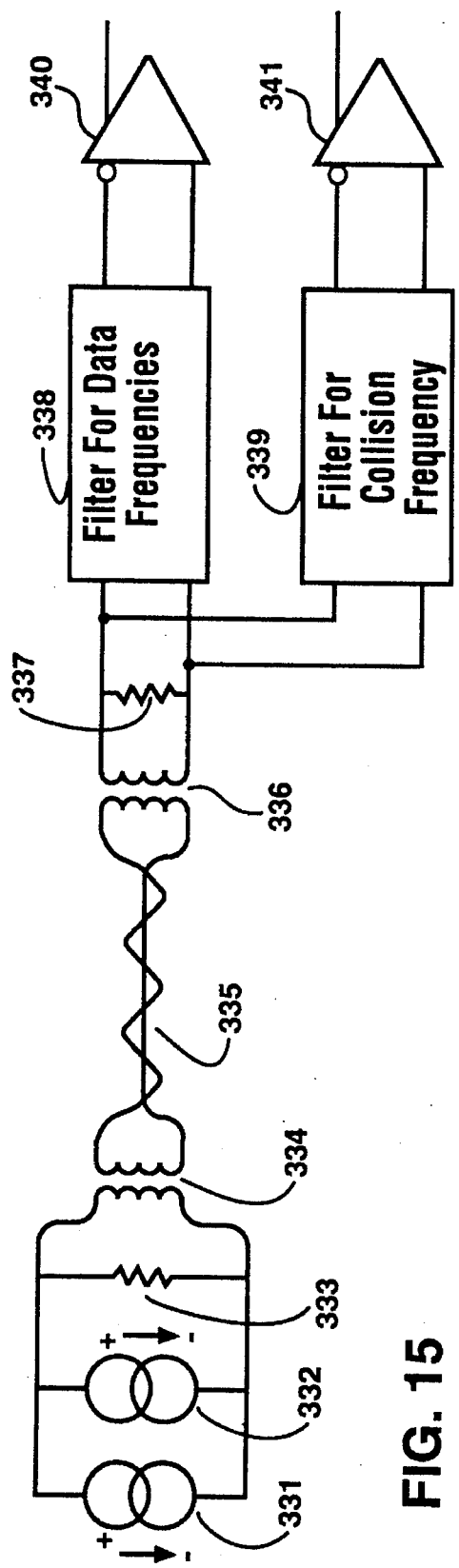
FIG. 15
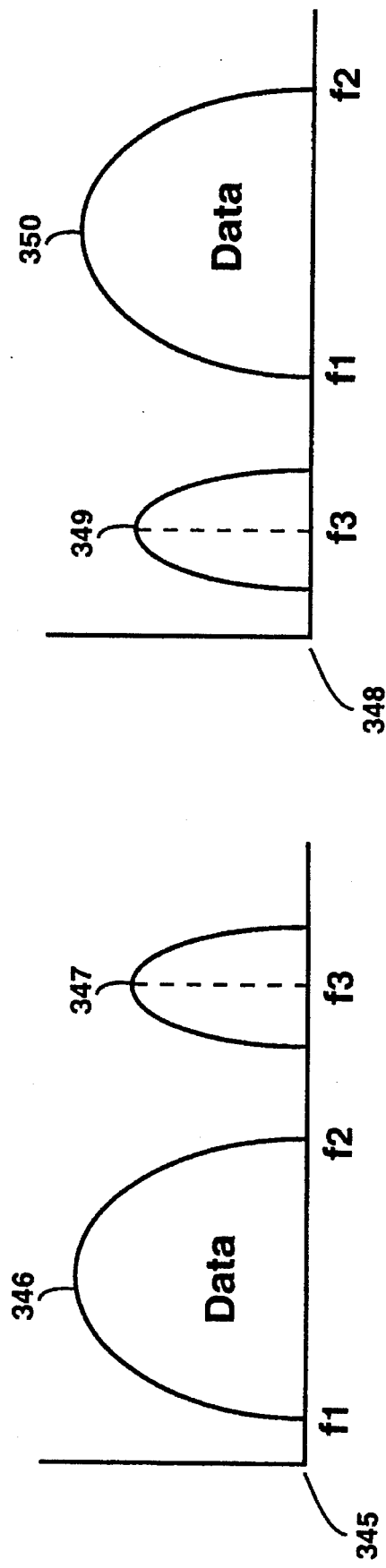
FIG. 17
FIG. 16

HIGH SPEED DATA TRANSFER OVER TWISTED PAIR CABLING

CROSS REFERENCE TO RELATED APPLICATION

This application is a divisional of application Ser. No. 07/972,694, filed Nov. 6, 1992.

BACKGROUND

The present invention concerns a high speed data transfer over twisted pair cabling.

Generally, for high speed data transfer in a local area network (LAN) where data transfer rates are in excess of 25 MHz, data has been transferred using a fiber optic media. For example, the fiber distributed data interface (FDDI) protocol is a common network protocol which operates using a fiber optic medium.

The use of fiber optic media for local area networking presents various problems. Particularly, most existing buildings do not have an installed base of fiber optic cable. Therefore, to utilize a fiber optic network it is generally required to specially install fiber optic cabling. This can be cost prohibitive.

There has been some work done to increase the rate over which data can be transferred over installed twisted pair cabling. Twisted pair cabling is used for voice grade telephone transmissions. See for example U.S. Pat. No. 5,119,402 issued to Simon A. Ginzburg et al. for a Method and Apparatus for Transmission of Local Area Network Signals over Unshielded Twisted Pairs. However, in the prior art there has been no work which has sufficiently increased the speed of data transmission so that transmission over a four pair voice grade twisted wire pair network can rival the speed of data transmissions over fiber optic cabling.

SUMMARY OF THE INVENTION

In accordance with the preferred embodiment of the present invention, a method is presented which provides for a first network node in a plurality of network nodes to transmit a data packet to a hub. The hub and the network nodes are interconnected within a local network system. Control signals are exchanged between the first network node and the hub. The exchange of control signals is done in a first signal frequency range. A data packet is sent from the first network node to the hub. The data packet is sent using data signals within a second signal frequency range. The first signal frequency range and the second signal frequency range do not overlap.

In the preferred embodiment, the first network node is connected to the hub using a plurality of twisted wire pairs. When the control signals are exchanged between the first network node and the hub, a first set of the first plurality of twisted wire pairs is used to send control signals from the first network node to the hub. A second set of the first plurality of twisted wire pairs is used to send control signals from the hub to the first network node. When the data packet is sent from the first network node to the hub, all twisted wire pairs in the first plurality of twisted wire pairs are used to send data packet from the first network node to the hub. For example, the first set of the first plurality of twisted wire pairs includes two twisted wire pairs. The second set of the first plurality of twisted wire pairs includes two twisted wire pairs.

Additionally, in a preferred embodiment, control signals are exchanged between the hub and each of the plurality of network nodes excluding the first network node. This exchange of control signals is done in the first signal frequency range for the purpose of providing arbitration to determine which network node will transfer a next data package to the hub. Further, this exchange of control signals is done simultaneously to the data packet being sent from the first network node to the hub.

In one embodiment of the present invention, while receiving the data packet from the first network node, the hub checks a destination address for the data packet. When the destination address is for a second network node in the plurality of network nodes, the hub sends the data packet to the second network node as the hub receives the data packet from the first network node. When the destination address is for a first subset of at least two of the plurality of network nodes, the hub stores the data packet until the hub completely receives the data packet from the first network node. Then the hub sends the data packet to the first subset of network nodes.

BRIEF DESCRIPTION OF THE DRAWINGS

FIG. 5 shows a simplified block diagram of a transceiver within the hub shown in FIG. 4 in accordance with the preferred embodiment of the present invention.

FIG. 15 is a block diagram of a circuit which facilitates collision detection in a network in accordance with a preferred embodiment of the present invention.

FIG. 16 and FIG. 17 show potential frequency spectrums for signals sent across a twisted pair shown in FIG. 15 in accordance with a preferred embodiment of the present invention.

DESCRIPTION OF THE PREFERRED EMBODIMENT

Figure 1:
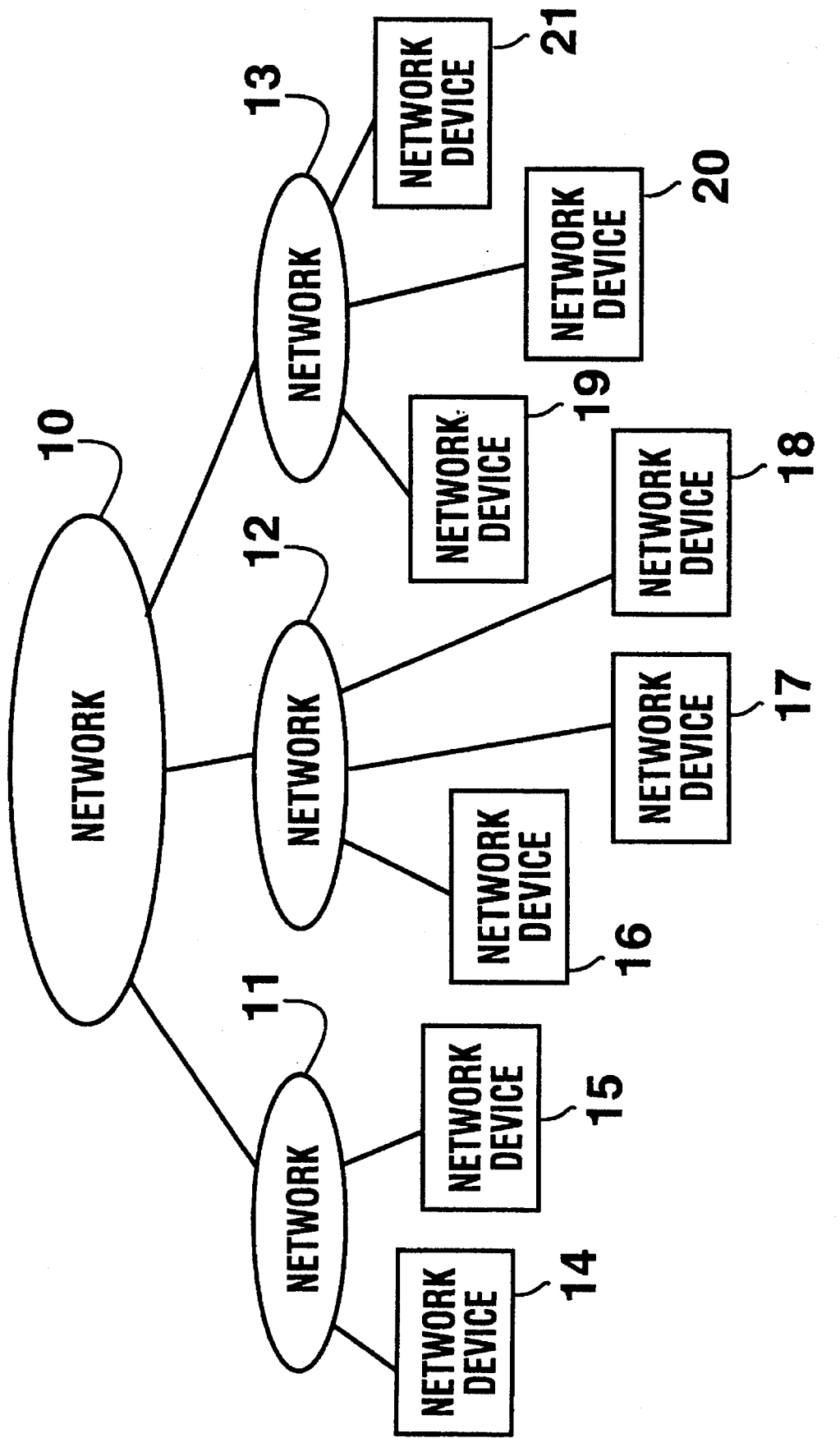
FIG. 1 shows a simplified block diagram of the interconnection of various networks.

FIG. 1 shows a simplified block diagram of the interconnection of various networks. A local area network 11, a local area network 12 and a local area network 13 are connected, for example, through a bridge to network 10. Network 10 operates, for example, using the fiber distributed data interface (FDDI) protocol. Local area network 11 and local area network 13, may operate, in accordance with any number of protocols. For example, if connected through a router, these local area networks could operate in accordance with the IEEE 802.3 protocol, with the Token Ring protocol, with ISDN protocol or with WAN protocol.

Various network devices may be connected to the local area networks. For example, a network device 14 and a network device 15 are shown connected to local area network 11. A network device 16, a network device 17 and a network device 18 are shown connected to local area network 12. A network device 19, a network device 20 and a network device 21 are shown connected to local area network 13. Network devices 14 through 21 may be, for example, a work station, a personal computer, a network server, or some other device.

Figure 2:
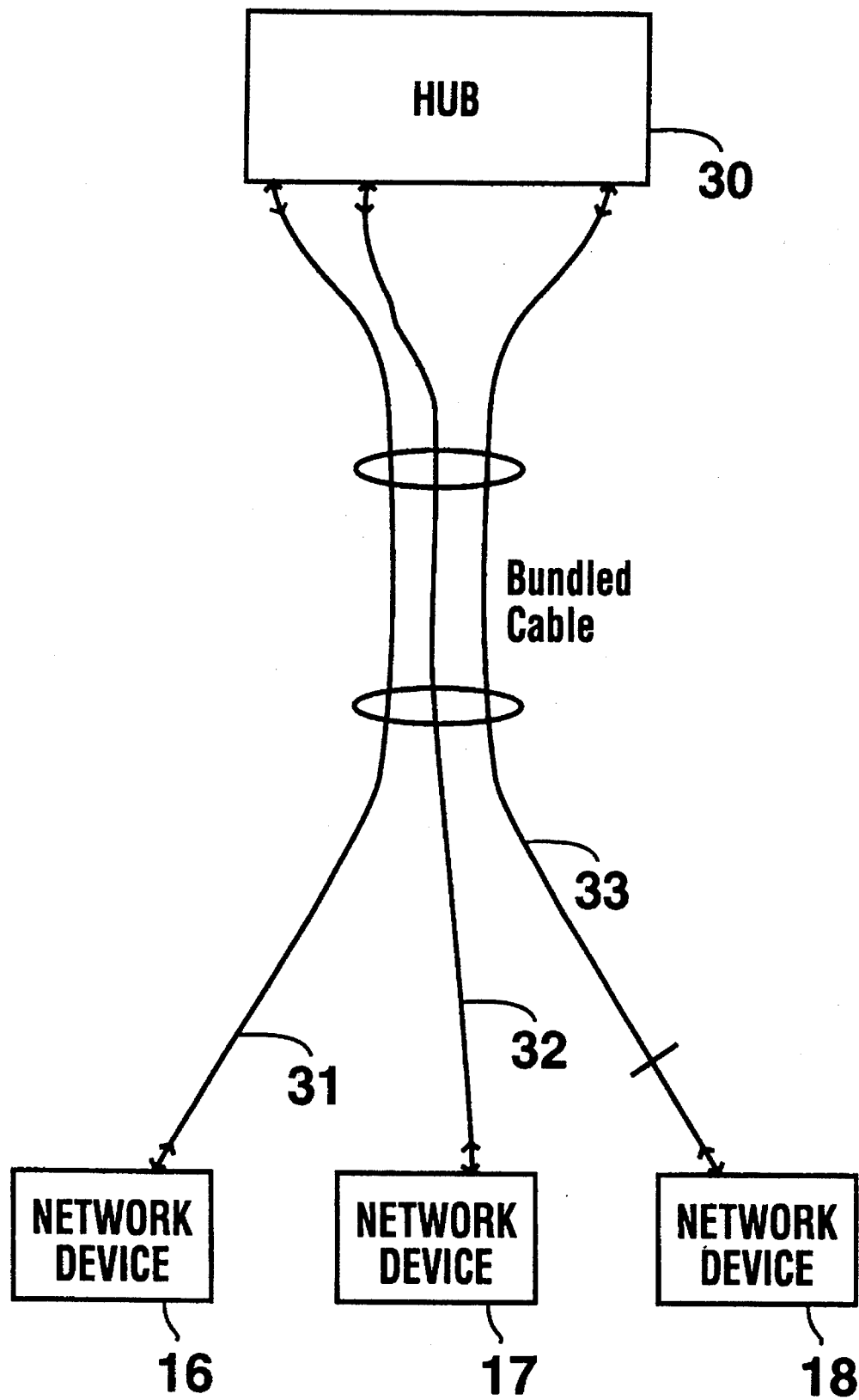
FIG. 2 shows a simplified block diagram of a network in accordance with a preferred embodiment of the present invention.

FIG. 2 shows a block diagram of local area network 12. Local area network 12 includes a hub 300. Hub 30 is connected to network device 16 through four twisted pairs of copper cable 31. Hub 30 is connected to network device 17 through four twisted pairs or copper cable 32. Hub 30 is connected to network device 18 through four twisted pairs of copper cable 33.

Figure 3:
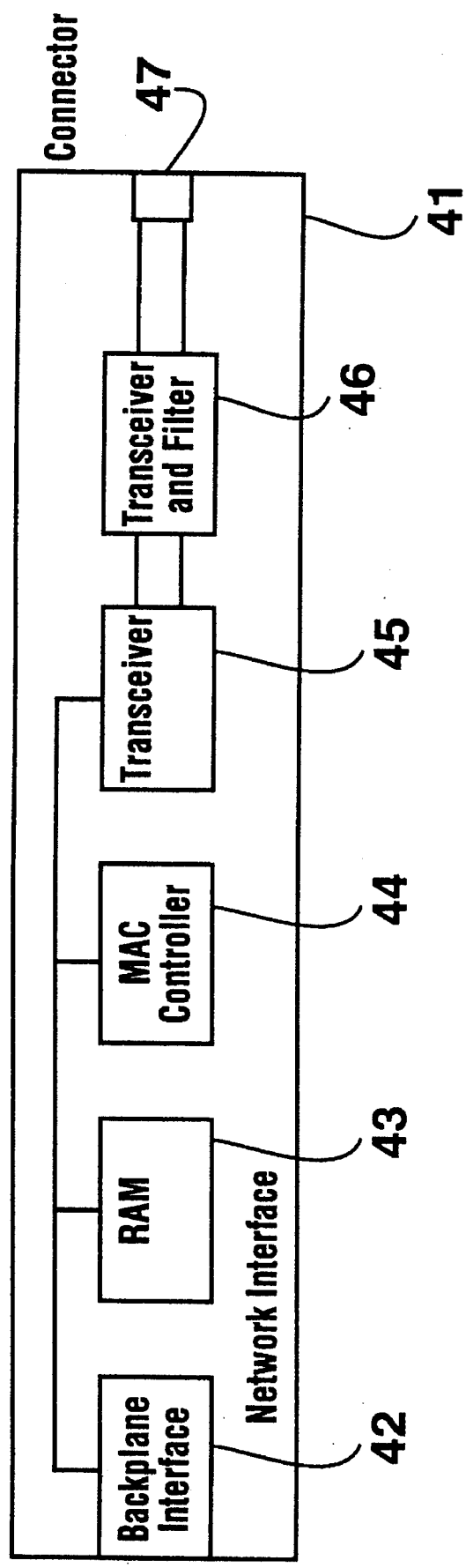
FIG. 3 shows a simplified block diagram of a network device of the network shown in FIG. 2 in accordance with a preferred embodiment of the present invention.

FIG. 3 shows a simplified block diagram of a network interface 41, which is used by each of network devices 16, 17 and 18 to interface with hub 30. A backplane interface 42 provides an interface between computer system RAM and the network device. A random access memory (RAM) 43 is used to temporarily store data packets received from or to be transferred out on the network. A media access controller (MAC) 44 is used to control the flow of data within network interface 41. A transceiver 45 is used to send and receive through the network, A transformer and filter 46 is used to adjust voltage and provide noise filtering for signals transferred between transceiver 45 and a connector 47. A connector 47 is connected to the bundle of four twisted pairs of copper wire from hub 30.

Figure 3A:
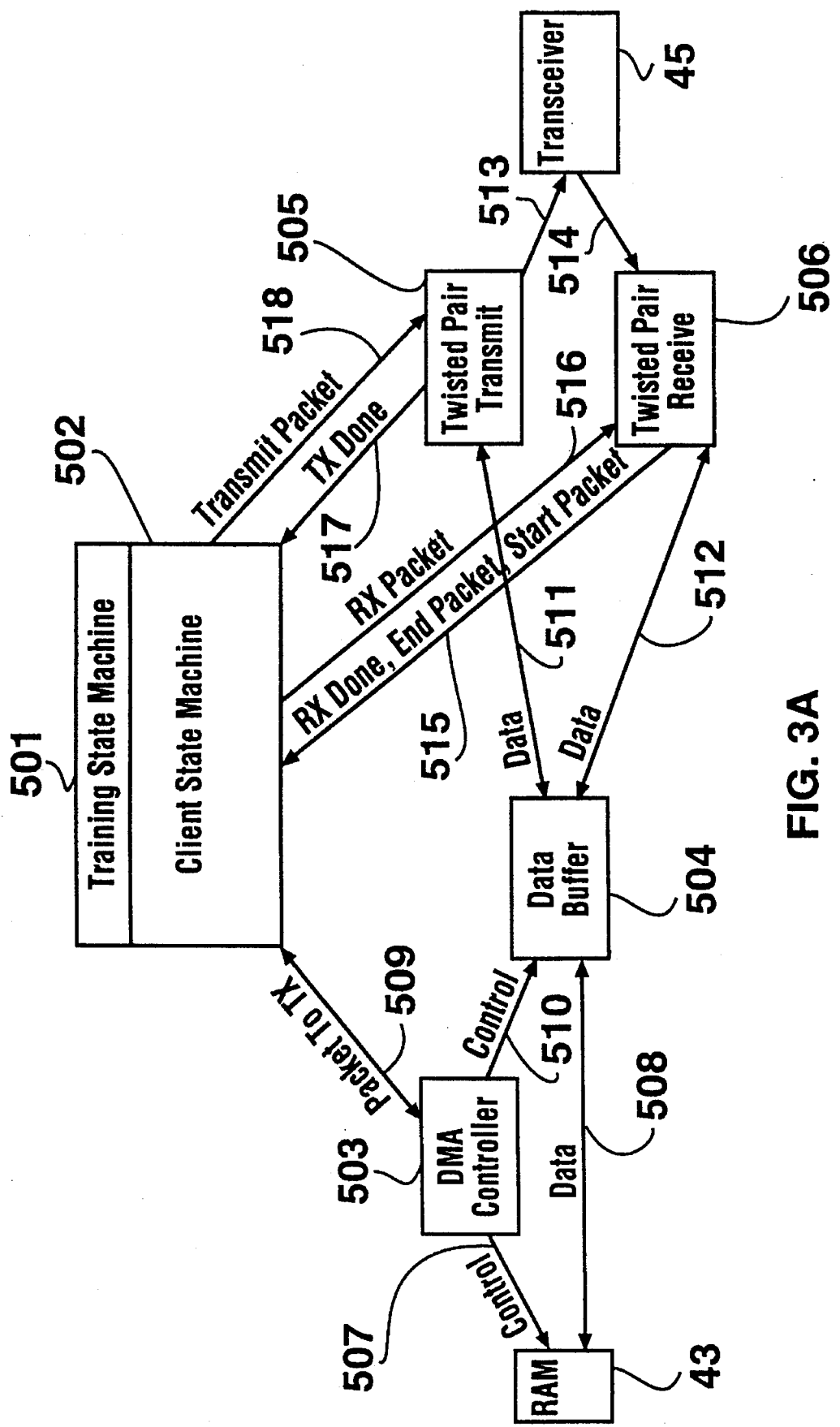
FIG. 3A is a block diagram which shows logical flow of information within the network device shown in FIG. 3 in accordance with a preferred embodiment of the present invention.

FIG. 3A is a block diagram which shows logical flow of information within network interface (client) 41. A client training state machine 501 is used in initializing connection between network device 17 and hub 30. A client state machine 502 is used to control data transactions between network device 17 and hub 30. A DMA controller 503 is used to control DMA transfers between RAM 43 and a data buffer 504. Twisted pair transmit logic forwards data to transceiver 45. Twisted pair receive logic receives data from transceiver 45.

Control signals flow from DMA controller 503 to RAM 43 through an information channel 507. Control signals flow from DMA controller 503 to data buffer 504 through an information channel 510. Data flow between DMA controller 503 and RAM 43 through an information channel 508. DMA controller 503 signals client state machine 502 through information channel 509 when there is a packet to transmit. Data buffer 504 sends data to twisted pair transmit logic 505 through information channel 511. Data buffer 504 receives data from twisted pair receive logic 506 through information channel 512. Transceiver 45 receives data from twisted pair transmit logic 505 through information channel 513. Transceiver 45 sends data to twisted pair receive logic 506 through information channel 514. Twisted pair receive 506 signals client state machine 502 through an information channel 515 at the start of a packet and the end of a packet (RXDONE). Client state machine 502 signals twisted pair receive 506 through an information channel 516 when a packet is to be received. Twisted pair transmit 505 signals client state machine 502 through an information channel 517 when a transmit is complete. Client state machine 502 signals twisted pair transmit 505 through an information channel 518 when a packet is to be transmitted.

Figure 4:
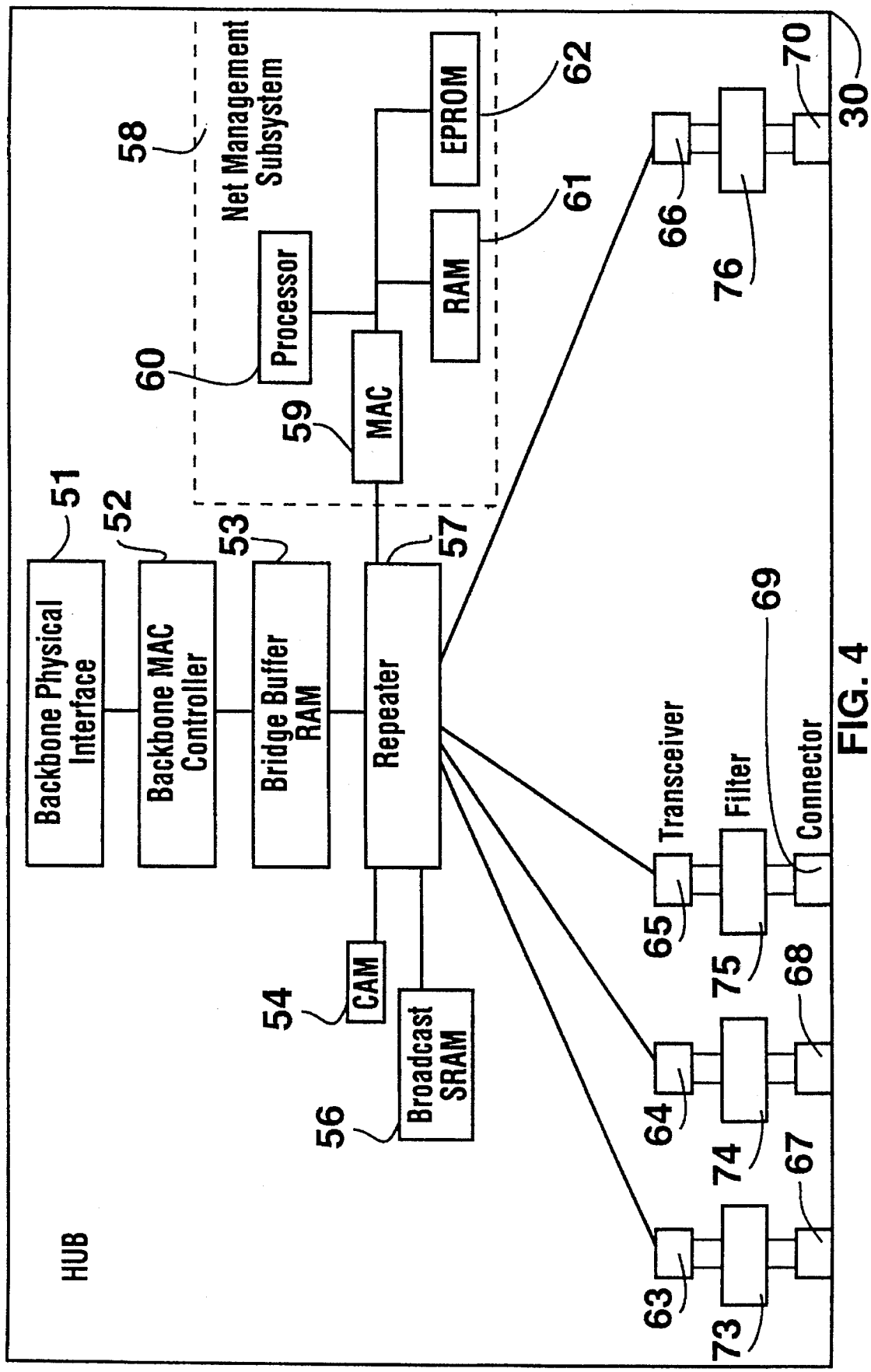
FIG. 4 shows a simplified block diagram of the hub of the network shown in FIG. 2 in accordance with a preferred embodiment of the present invention.

FIG. 4 shows a block diagram of hub 30. A backbone physical interface 51 provides a physical interface of hub 30 to network 10. A backbone media access controller (MAC) 52 controls data flow between hub 30 and network 10. A bridge buffer RAM 53 provides temporary storage for data flowing between hub 30 and network 10. A repeater 57 directs data flow on local area network 12. A content addressable memory (CAM) 54 is addressable with a network address and outputs an associated port. A broadcast SRAM 56 is used for temporary storage of multi-port messages which are to be broadcast across LAN 12.

A network management system 58 provides network management. Network management system 58 includes a processor 60, an EPROM 62, a RAM 61 and a memory access controller (MAC) 59. EPROM 62 stores program information used by processor 60. RAM 61 stores programs used by processor 60. MAC 59 provides a means for processor 60 to communicate with other nodes on the network.

A transceiver 63 is used to send and receive data to and from a network device connected to a connector 67. A transceiver 64 is used to send and receive data to and from a network device connected to a connector 68. A transceiver 65 is used to send and receive data to and from a network device connected to a connector 69. A transceiver 66 is used to send and receive data to and from a network device connected to a connector 70. While only transceivers 63 through 66 and connectors 67 through 70 are shown, many more transceivers and connectors can be added. For example, in the preferred embodiment of the present invention, the hub has 24 ports. A transformer/filter 73 connects transceiver 63 to connector 67. A transformer/filter 74 connects transceiver 64 to connector 68. A transformer/filter 75 connects transceiver 65 to connector 69. A transformer/filter 76 connects transceiver 66 to connector 70.

Figure 5:
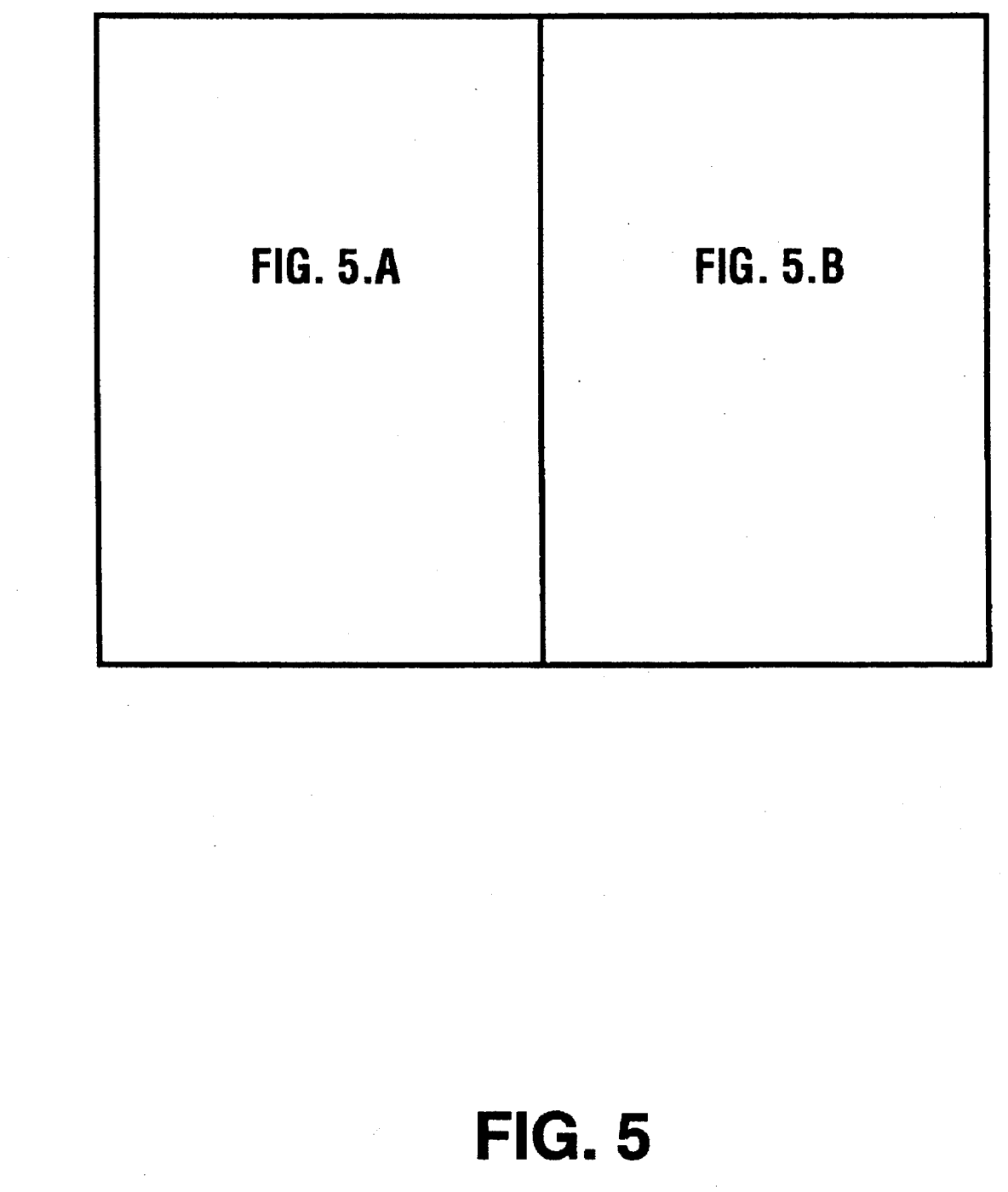

FIG. 5 shows a block diagram of transceiver 63. Transceiver 63 is connected to connector 67 through four twisted wire pairs. The first twisted wire pair includes a connector line 81 and a connector line 82. The second twisted wire pair includes a connector line 83 and a connector line 84. The third twisted wire pair includes a connector line 85 and a connector line 86. The fourth twisted wire pair includes a connector line 87 and a connector line 88.

When transceiver 63 receives data over the four twisted pairs, the data is received by an equalization circuit 91, an equalization circuit 92, an equalization circuit 93 and an equalization circuit 94. Each of equalization circuits 91 through 94, is used to provide a clean and amplified signal. In addition, equalization circuit 91 also provides a carrier detector signal on a carrier detector line 180.

A phase locked loop (PLL) clock and data recovery circuit 101 receives a clean and amplified signal on line 181 and 182. PLL clock and data recovery provides a data signal on a line 171, a clock signal on a line 175 and a clock valid signal on a line 279. A phase locked loop (PLL) clock and data recovery circuit 102 receives a clean and amplified signal on line 183 and 184. PLL clock and data recovery provides a data signal on a line 172, a clock signal on a line 176 and a clock valid signal on a line 280. A phase locked loop (PLL) clock and data recovery circuit 103 receives a clean and amplified signal on line 185 and 186. PLL clock and data recovery provides a data signal on a line 173, a clock signal on a line 177 and a clock valid signal on a line 281. A phase locked loop (PLL) clock and data recovery circuit 104 receives a clean and amplified signal on line 187 and 188. PLL clock and data recovery provides a data signal on a line 174, a clock signal on a line 178 and a clock valid signal on a line 282.

An elasticity buffer 111, an elasticity buffer 112, an elasticity buffer 113 and an elasticity buffer 114 synchronize the data signals from PLL clock and data recovery circuits 101 through 104 to a single clock. Elasticity buffer 111 receives the data signal and clock signal from PLL clock and data recovery circuit 101 and produces a synchronized data signal on line 191. Elasticity buffer 112 receives the data signal and clock signal from PLL clock and data recovery circuit 102 and produces a synchronized data signal on line 192. Elasticity buffer 113 receives the data signal and clock signal from PLL clock and data recovery circuit 103 and produces a synchronized data signal on line 193. Elasticity buffer 114 receives the data signal and clock signal from PLL clock and data recovery circuit 104 and produces a synchronized data signal on line 194.

A logic OR gate 170 receives the clock signal on line 175, the clock valid signal on line 279, the clock valid signal on line 280, the clock valid signal on line 281 and the clock valid signal on line 282. Logic OR gate 170 produces a clock signal (Clk 0) on a line 190. The Clk 0 signal passes through Logic OR gate 170 when the four clock valid signals are asserted low. Driver buffer 106 forwards data to repeater 57 on a line 126, a line 127, a line 128 and a line 129. Driver 106 also provides a clock signal on a line 129.

Receive line state logic 105 is used to receive and forward transfer setup requests over the first and the second twisted wire pairs. Receive line state logic 105 receives the carrier detector signal on carrier detector line 180, the data signal on line 171, the data signal on line 172 and the clock signal on line 175. Receive line state logic 105 produces a priority (PRI) request signal on a line 121, a receive line state signal (RLS0) on a line 122, a receive line state signal (RLS1) on a line 123, an receive line state signal (RLS2) on a line 124 for forwarding to repeater 57. Repeater enables receive line state logic 105 by placing a receive line state enable signal on a line 125. A receiver enable signal (RXEN) is generated by repeater 57 to select receive line state logic 105 or driver buffer 106 to forward information to repeater 57.

When transceiver 63 is used by repeater 57 to transmit data, repeater 57 places a first data signal (TDATA0) on transmit data line 137, a second data signal (TDATA1) on transmit data line 138, a third data signal (TDATA2) on transmit data line 139 and a fourth data signal (TDATA3) on transmit data line 140. When transceiver 63 is used by repeater 57 to transmit control signals, repeater 57 places a first transmit line signal (TLS0) on a line 132, a second transmit line signal (TLS1) on a line 133, a third transmit line signal (TLS2) on a line 134, and a transmit line clock (TLSCK) on a line 135. TLSCK is used to store the TLS values. Transmit line state logic 115 generates tones and drives the TLS values to be forwarded to a multiplexor/transmitter 116.

Multiplexor/transmitter 116, in response to a transmit enable signal (TXEN) on a line 136, selects either data signals on lines 137, 138, 139 and 140 to be forwarded to the four twisted wire pairs 81 through 88, or the tones and driver enables from transmit line state logic to be forwarded to the third and fourth twisted wire pairs 85 through 88. A transmitter clock (TXCLK) is provided to transmit line state logic 115 and multiplexor transmitter 116 on a line 141.

Figure 6:
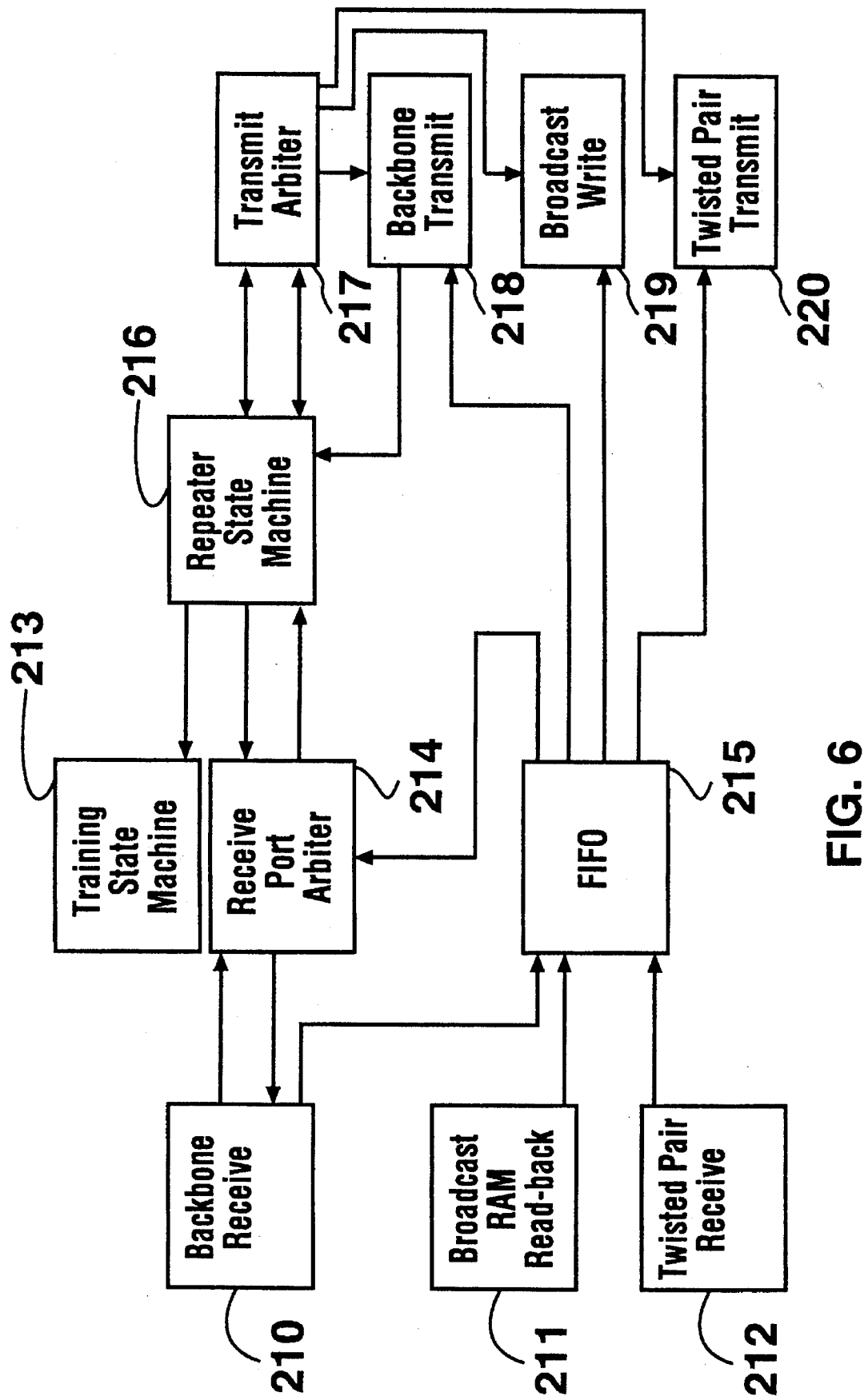
FIG. 6 shows a simplified block diagram of a repeater within the hub shown in FIG. 4 in accordance with the preferred embodiment of the present invention.

FIG. 6 is a block diagram showing data flow within repeater 57. Repeater 57 essentially functions to channel transferred data. Twisted pair receive logic 212 receives data and control signals from the transceivers, e.g., transceivers 63, 64, 65 and 66. For example, twisted pair receive logic 212 is connected to lines 121 through 131 of transceiver 63. Broadcast RAM read-back logic 211 receives data from broadcast SRAM 56. Backbone receive logic receives data from bridge buffer RAM 53.

Twisted pair transmit logic 220 sends data and control signals to the transceivers, e.g., transceivers 63, 64, 65 and 66. For example, twisted pair transmit logic 220 is connected to lines 132 through 141 of transceiver 63. Broadcast write logic 219 sends data to broadcast SRAM 56. Backbone transmit logic sends data to bridge buffer RAM 53.

The data received by twisted pair receive logic 212, broadcast RAM read-back logic 211 and backbone receive logic 210 is channeled through a first-in-first-out (FIFO) buffer 215 to either backbone transmit logic 218, broadcast write logic 219 or twisted pair transmit logic 220. FIFO buffer 215 also provides arbitration information to a receiver port arbiter 214.

Receiver port arbiter 214 selects from which port to receive a data transmission. In general, a simple arbitration scheme is used. For example, a round robin arbitration scheme may be used in which the last port from which a data transmission is received is given lowest priority. A transmit arbiter 217 determines to which port of backbone transmit logic 218, broadcast logic write logic 219 or twisted pair transit logic 220 data is to be transmitted. Transmit arbiter 217 determines where to send a message by forwarding a network address of the message to CAM 54. CAM 54 returns a port number to transmit arbiter 217. Repeater 57 also includes a repeater state machine 216 and a training state machine 213.

Figure 7:
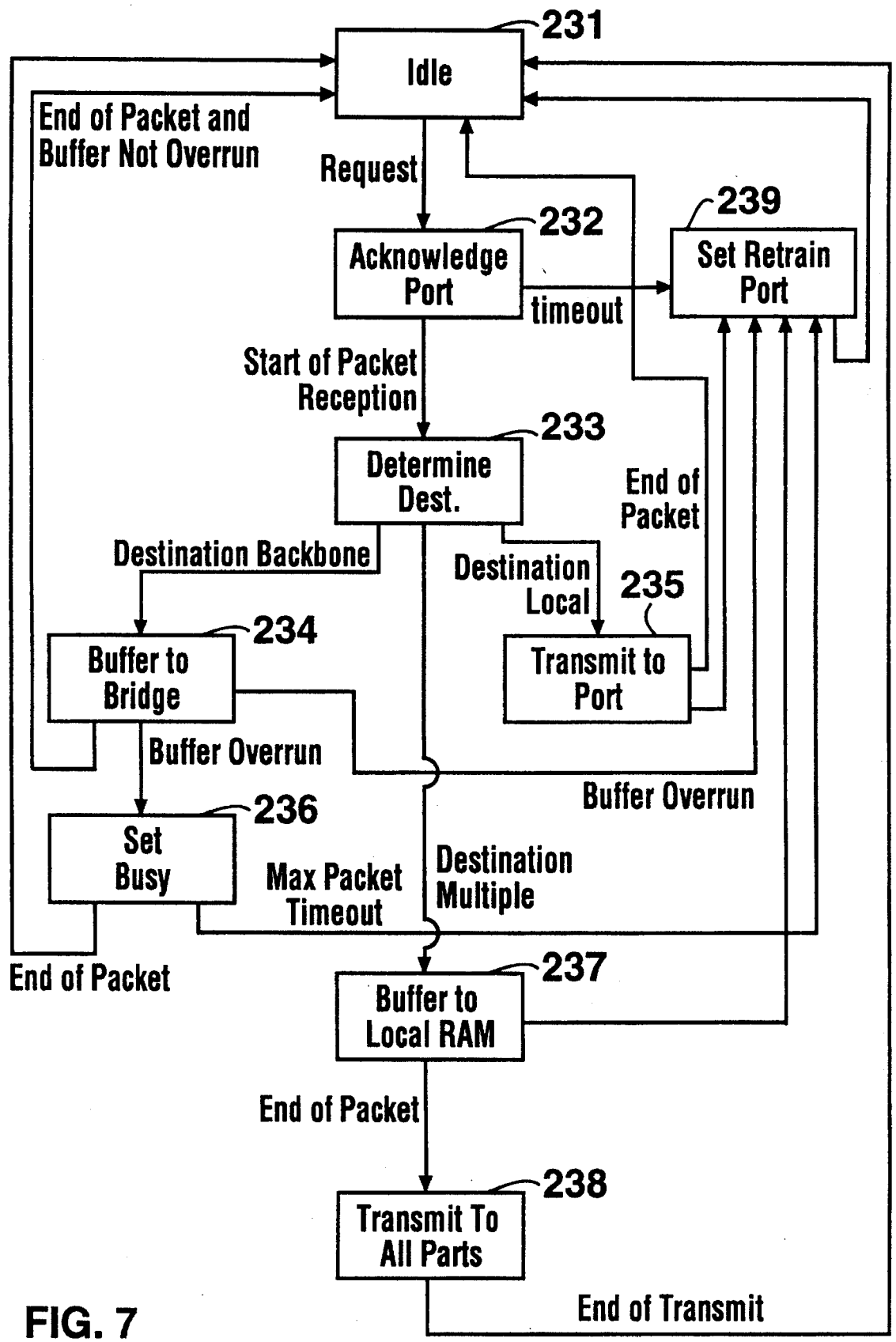
FIG. 7 is a state diagram for a repeater state machine within the repeater shown in FIG. 6 in accordance with the preferred embodiment of the present invention.

FIG. 7 shows a state diagram for repeater state machine 216. After start-up and training of all ports (as explained below) has taken place, repeater state machine is an idle state 231. Upon receiving a request for transfer from receiver port arbiter 214, repeater state machine enters an acknowledge port state. When repeater state machine 216 is in the acknowledge port state, repeater 57 sends an acknowledge signal to the port which was selected by receiver port arbiter 214. If repeater 57 times out before repeater 57 begins to receive a data packet from the selected port, repeater state machine enters a set retrain port state 239. In set retrain port state 239, repeater state machine 216 signals training state machine 213, to retrain the port. Repeater state machine 216 then returns to idle state 231.

From acknowledge port state 232, upon repeater 57 beginning to receive a network data packet, repeater state machine 216 enters a determine destination state 233. While repeater state machine 216 is in determine destination state 233, transmit arbiter 217 determines where to send a message by forwarding the network address in the network data packet to CAM 54. CAM 54 returns a port number to transmit arbiter 217.

If transmit arbiter 217 determines the destination is to a port within local network 12, repeater state machine 216 enters a transmit to port state 235. In transmit to port state 235, data as it is received from the port selected by receive port arbiter 214 is forwarded immediately to the port selected by transmit arbiter 217. Upon repeater 57 receiving the complete network data packet and completion of the forwarding of the data, repeater state machine 216 returns to idle state 231. If complete data packet is not received within a specified time, repeater state machine 216 enters set retrain port state 239.

In determine destination state 233, if transmit arbiter 217 determines the destination is to multiple ports within local network 12, repeater state machine 216 enters a buffer to local RAM state 237. In buffer to local RAM state 237, data as it is received from the port selected by receive port arbiter 214 is forwarded to broadcast SRAM 56. If a complete data packet is not received within a specified time, repeater state machine 216 enters set retrain port state 239. Upon repeater 57 receiving the complete network data packet and completion of the forwarding of the data to broadcast SRAM 56, repeater state machine 216 enters a transmit to all ports state 238. In transmit to all ports state 238, repeater 57 reads the broad cast message in broadcast SRAM 56 and forwards the message to each of the ports specified. Upon completion of the data transmissions, repeater state machine 216 returns to idle state 231.

In determine destination state 233, if transmit arbiter 217 determines the destination is to the backbone of local network 12, repeater state machine 216 enters a buffer to bridge state 234. In buffer to bridge state 234, data as it is received from the port selected by receive port arbiter 214 is forwarded to bridge buffer RAM 53. If a complete data packet is not received within a specified time, repeater state machine 216 enters set retrain port state 239. Upon repeater 57 receiving the complete network data packet and completion of the forwarding of the data to buffer RAM 53, repeater state machine 216 returns to idle state 231. If buffer RAM 53 runs out of available memory locations before completion of the transfer of the network data packet, repeater state machine 216 enters a set busy signal state 236. In set busy signal state 236, repeater 57 sends a busy signal to the transmitting data port and throws away the network data packet. Upon completion of the transfer of the network data packet to repeater 57, repeater state machine 216 returns to idle state 231.

Figure 8:
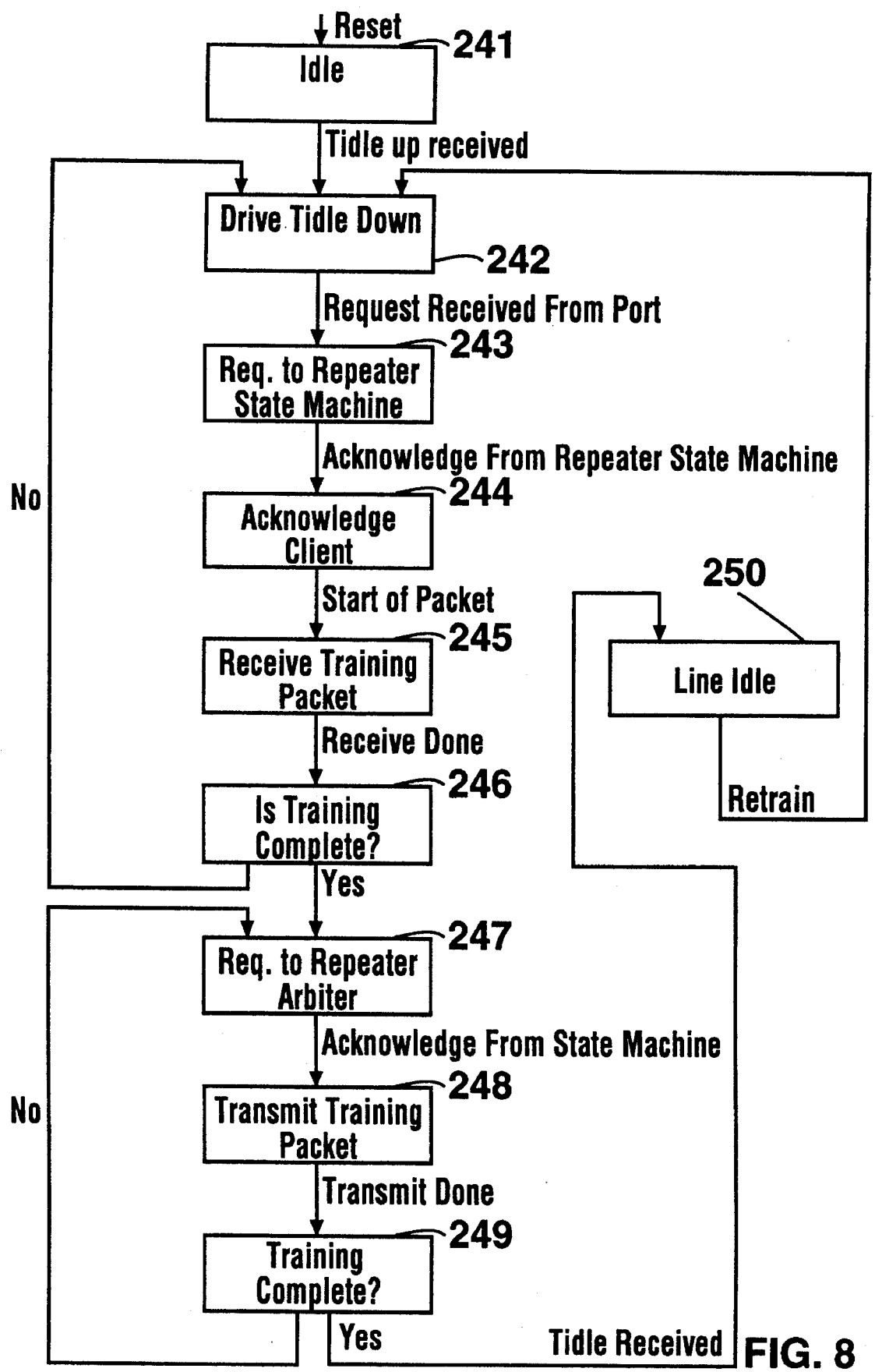
FIG. 8 is a state diagram for a training state machine within the repeater shown in FIG. 6 in accordance with the preferred embodiment of the present invention.

FIG. 8 is a state diagram for training state machine 213. After a reset or whenever it is necessary to train a port, training state machine 213 proceeds through the training states. Before training a port, training state machine 213 is in an idle state 241. When training state machine 213 receives a training idle up signal from a port which requests training, training state machine 213 enters a drive transmit idle down state 242. In training idle down state 242, repeater 57 sends a training idle down signal to the port requesting training.

Upon receiving a request to transmit signal from the port to be trained, training state machine 213 enters a request to repeater state machine state 243. In request to repeater state machine state 243, training state machine 213 waits for repeater state machine 216 to acknowledge the port to be trained. Upon repeater state machine 216 providing the acknowledgment, training state machine 213 enters an acknowledge client state 244. In acknowledge client state 244, training state machine 213 waits for the port to start sending a training packet.

Upon the port starting to send a packet, training state machine 213 enters a receive training packet state 245. In receive training packet state 245, training state machine 213 waits for completion of the sending of the training packet. When the training packet has been received, training state machine enters a training completion state 246. In training completion state 246, a check is done to see whether receive training is complete. For example, in the preferred embodiment, training is complete if 25 consecutive training packets have been received without errors. If there are errors in reception, the equalization and clock frequencies are adjusted in the transceiver for the port. If receive training is not complete, training state machine 213 returns to drive training idle down state 242.

When receive training is complete, training state machine 213 enters a request to repeater arbiter state 247. In request to repeater arbiter state 247, training state machine 213 requests transmit arbiter 217 to initiate the transmission of a training packet to the port being trained. Upon receiving an acknowledgment from repeater state machine 216, training state machine 213 enters a transmit training packet state 248. Upon completion of the transmission of the transmit training packet state, training state machine 213 enters a training complete state 249. If transmit training is not complete, training state machine 213 returns to request to repeater arbiter state 247.

When transmit training is complete, training state machine 213 enters a port is in line idle state 250. Training state machine 213 remains in port is in line idle state 250 during normal operation of the port. When the port requests retraining, training state machine 213 returns to drive training idle down state 242.

Figure 9:
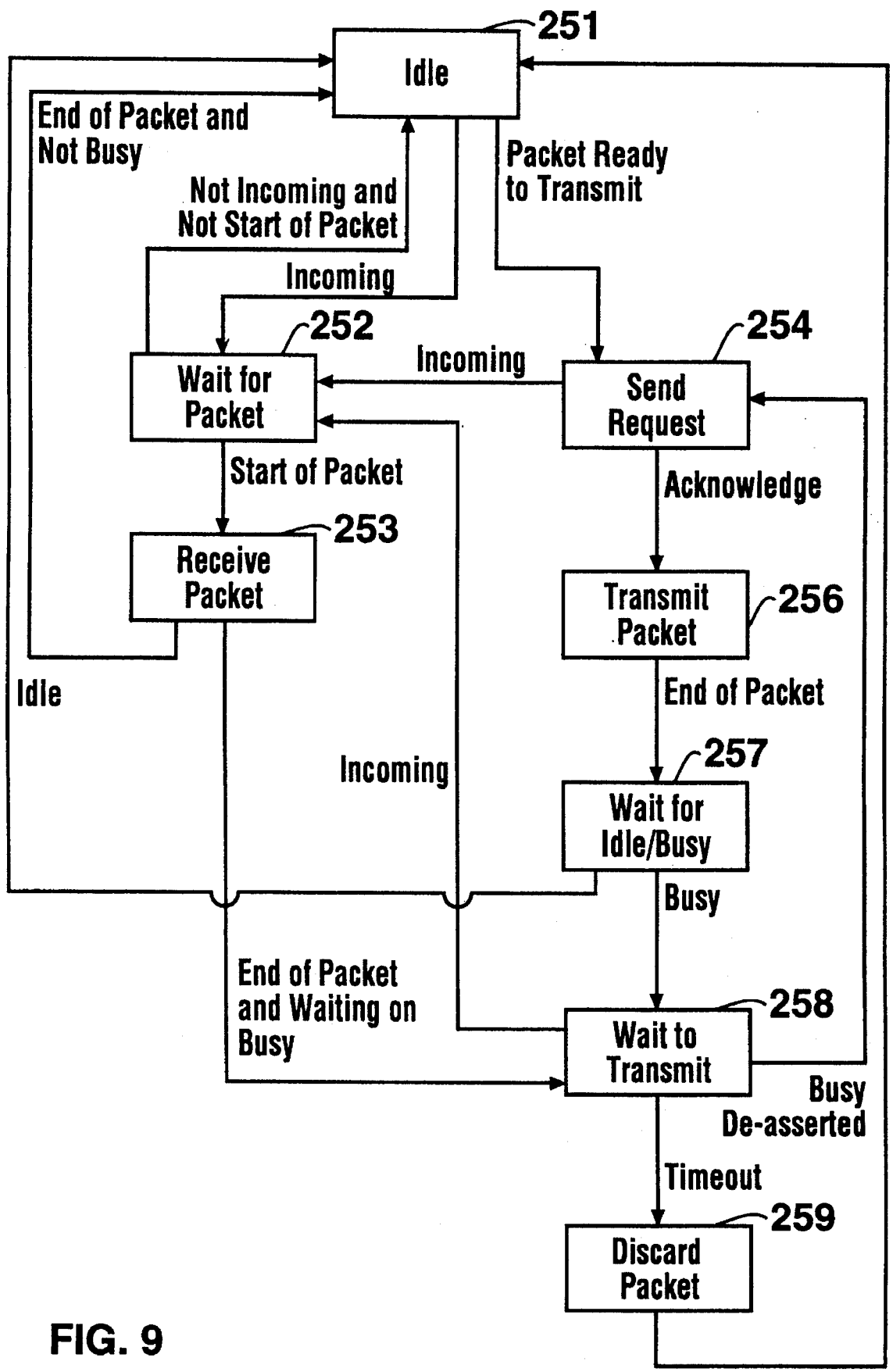
FIG. 9 is a state diagram for a client state machine within the network device shown in FIG. 3A in accordance with the preferred embodiment of the present invention.

FIG. 9 shows a diagram for client state machine 502. Client state machine 502 is initially in an idle state 251. When hub 30 signals that a packet will be incoming to the client, client state machine 502 enters a wait for packet state 252. In wait for packet state 252, if the client sees the receive line state transition to a state other than incoming, such as idle, client state machine 502 returns to idle state 251. Upon the client beginning to receive a packet, client state machine 502 enters a receive packet state 253.

In receive packet state 253, client state machine 502 waits for the end of the packet. When the end of the packet is received and client state machine 502 is not waiting on a busy signal, client state machine 502 returns to idle state 25 1. When The end of the packet is received and client state machine 502 is waiting on a busy signal, client state machine 502 enters a wait to re-transmit state 258.

From idle state 251, when the client desires to transmit a packet, the client state machine 502 enters a send request state 254. In send request state 254, sends a request to transmit signal to hub 30. The client then waits for an acknowledgment from hub 30. While waiting, if hub 30 signals that a packet will be incoming to the client, client state machine 502 enters wait for packet state 252. In send request state 254, when the client receives an acknowledgment from hub 30, client state machine 502 enters a transmit packet state 256. In transmit packet state 256, the client sends a data packet to hub 30. Upon the end of packet being sent, client state machine 502 enters a wait for idle/busy state 257. In wait for idle/busy state 257, if the client receives an idle signal from hub 30, transmission of the packet was successful and client state machine 502 returns to idle state 251. If the client receives a busy signal from hub 30, client state machine 502 enters wait to re-transmit state 258.

In wait to re-transmit state 258, client state machine 502 waits for hub 30 to stop sending a busy signal. If hub 30 signals that a packet will be incoming to the client, client state machine 502 enters wait for packet state 252. When in wait to re-transmit state 258, client state machine 502 detects the busy signal from hub 30 being de-asserted, client state machine 502 returns to send request state 254. When in wait to re-transmit state 258, client state machine 502 times out waiting for hub 30 to de-assert the busy signal, client state machine 502 enters a discard packet state 259.

When client state machine 502 is in discard packet state 259, the client discards the network packet. Then, client state machine 502 returns to idle state 251.

Figure 10:
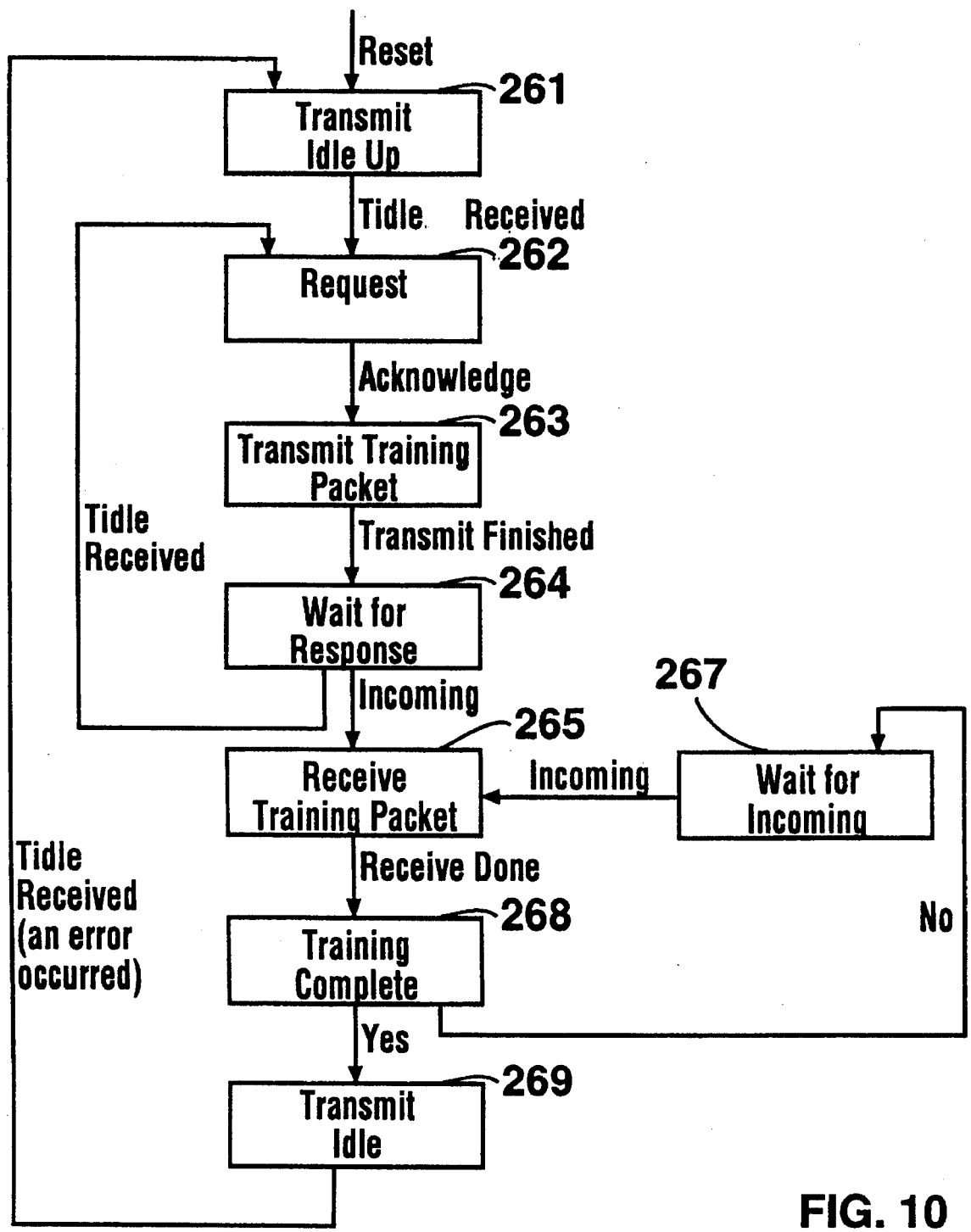
FIG. 10 is a state diagram for a client training state machine within the network device shown in FIG. 3A in accordance with the preferred embodiment of the present invention.

FIG. 10 shows a state diagram for client training state machine 501. Upon receipt of a reset, client training state machine 501 enters a training idle up state 261. In training idle up state 261, the client forwards to hub 30 a training idle up signal. Upon hub 30 signaling the client that the training idle up signal has been received, client training state machine 501 enters request state 262. When client training state machine 501 is in request state 262, the client signals to hub 30 a request to transmit a training packet. Upon an acknowledgment from hub 30, client training state machine 501 enters a transmit training packet state 263. When client training state machine 501 is in transmit training packet state 263, the client transmits the training packet to hub 30. When the transmission is complete, client training state machine 501 enters a wait for response state 264.

When client training state machine 501 is in wait for response state 264 and the client receives a training idled signal from hub 30, client training state machine 501 returns to request state 262. When client training state machine 501 is in wait for response state 264 and the client receives from hub 30 an incoming packet signal, client training state machine 501 enters a receive training packet state 265.

In receive training packet state 265, when the client has received the entire training packet, client training state machine 501 enters a training complete state 268. If training is not complete, client training state machine 501 enters a wait for incoming state 267. When client training state machine 501 is in wait for incoming state 267 and the client receives from hub 30 an incoming packet signal, client training state machine 501 enters receive training packet state 265.

When client training state machine 501 is in training complete state 268 and training is complete, client training state machine 501 enters transmit idle state 269. When client training state machine 501 is in transmit idle state 269, the client is in a normal operating state. Upon a transmission error occurring, the client receives a transmit idled signal from hub 30. Upon receipt of the transmit idled signal from hub 30, client training state machine 501 returns to transmit idle up state 261.

Figure 11:
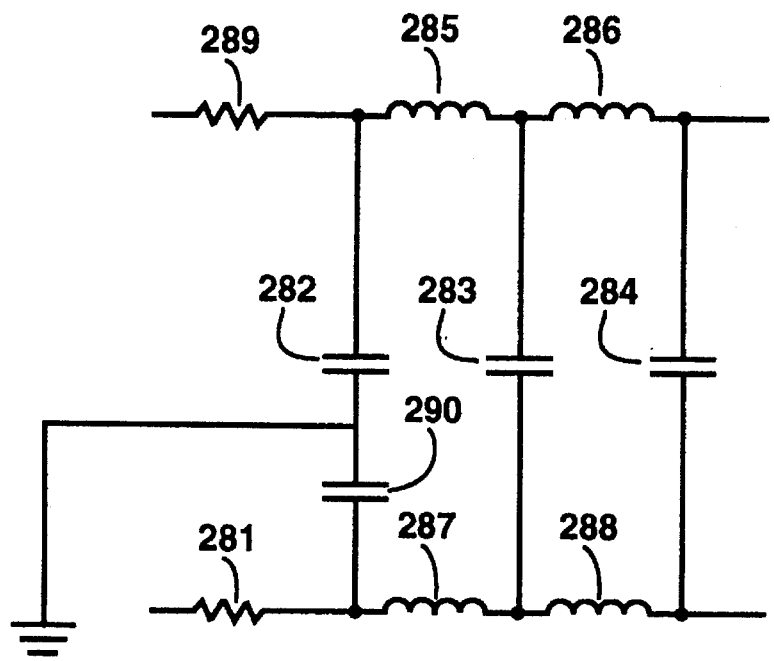
FIG. 11 is an example of a filter design which may be used the hub shown in FIG. 4 and the network device shown in FIG. 3 in accordance with the preferred embodiment of the present invention.

FIG. 11 shows an example of a filter design which may be used to implement filters 73 through 76 within hub 30, and may also be used to implement the filter portion of transformer and filter 36 within network interface 41. For example, filter has a return loss of less than or equal to −20 dB for signals from 100 KHz to 15 MHz. The 3 dB cutoff frequency is between 19–21 MHz. Stopband attenuation is greater than or equal to 13.5 dB at 30 MHz. The filter includes, for example, a resistor 281, a resistor 289, a capacitor 282, a capacitor 283, a capacitor 284, a capacitor 290, an inductor 285, an inductor 286, an inductor 287 and an inductor 288, connected as shown. For example, resistor 281 is 50 ohms, resistor 289 is 50 ohms, capacitor 282 is 33 picofarads, capacitor 283 is 110 picofarads, capacitor 284 is 160 picofarads, capacitor 290 is 33 picofarads, inductor 285 is 330 nanohenries, inductor 286 is 680 nano-henries, inductor 287 is 330 nano-henries, inductor 288 is 680 nano-henries.

In the preferred embodiment of the present invention, the physical layer implementation of the connection between hub 30 and network interface 41 is intended to provide a high speed communications link over low cost wiring. The below described specific application provides a 100 megabit communication channel over voice grade telephone wire. This is done by multiplexing 4 adjacent channels at 25 megabits each.

The media type for the twisted pairs is, for example, Category III UTP, Category IV UTP or Category V UTP. The media distance is for example 100 meters when using Category III UTP, 120 meters when using Category IV UTP, or 150 meters when using Category V UTP. The media configuration is a 4 pair, 25 pair bundles, (10-BASE-T compatible wiring systems).

In implementing the physical layer, a method of transmitting 25 megabits of information within a similar bandwidth to 10 BASE T encoding is desired to provide comparable attenuation and crosstalk characteristics. Comparable SNR and DC balance is also desired. For this purpose nonreturn to zero (NRZ) encoding using a 5B/6B block code is utilized to provide maximum balance. This is done by taking all balanced 6B symbols and associating them with particular 5B symbols. Then, the remaining 5B symbols are associated with 6B symbols that are unbalanced by a single bit. The same 5B symbols are also associated with the inverse of that 6B symbol. During transmission, a status bit determines whether the last unbalanced symbol sent was positive or negative. If the status indicates the last unbalanced symbol was positive, the encoder then inverts the next unbalanced symbol and toggles the status bit. This way, DC balance is maintained in the data stream. Care is taken to ensure that the unbalanced symbols have no more than three consecutive bits on the symbol boundary. This way the run-length is limited to no greater than six bit times. The following block code listed in Table 1 below meets the above criteria.

TABLE 1

| # | 5B/6B | # of 1s | # | 5B/6B | # of 1s | ALT5B/6B |
|---|-------|---------|---|-------|---------|----------|
| 0 | 000111 | 3 | 20 | 011011 | 4 | 100100 |
| 1 | 001011 | 3 | 21 | 011101 | 4 | 100010 |
| 2 | 001101 | 3 | 22 | 011110 | 4 | 100001 |
| 3 | 001110 | 3 | 23 | 100111 | 4 | 011000 |
| 4 | 010011 | 3 | 24 | 101011 | 4 | 010100 |
| 5 | 010110 | 3 | 25 | 101101 | 4 | 010010 |
| 6 | 011001 | 3 | 26 | 101110 | 4 | 010001 |
| 7 | 011010 | 3 | 27 | 111010 | 4 | 000101 |
| 8 | 011100 | 3 | 28 | 110101 | 4 | 001010 |
| 9 | 100011 | 3 | 29 | 110110 | 4 | 001001 |
| 10 | 100101 | 3 | 30 | 111001 | 4 | 000110 |
| 11 | 100110 | 3 | 31 | 110011 | 4 | 001100 |
| 12 | 101001 | 3 | | | | |
| 13 | 101100 | 3 | | | | |
| 14 | 110001 | 3 | | | | |
| 15 | 101010 | 3 | | | | |
| 16 | 110100 | 3 | | | | |
| 17 | 111000 | 3 | | | | |
| 18 | 010101 | 3 | | | | |
| 19 | 110010 | 3 | | | | |

Table 2 below lists the frame format for the transfer of data at the physical level.

TABLE 2

| | |
|---|---|
| Preamble | 8 symbols (sextets) of alternating 0s and 1s. |
| Start Delimiter | 1 symbol (sextet) of a specific one-zero pattern. |
| Destination Address | 48 bits which are split up among the four pairs. |
| Source Address | 48 bits which are split up among the four pairs. |
| Type/Length Field | 8 bits which are split up among the four pairs. |
| Data block | 64–1500 bytes split up among the four pairs. |
| Cyclic Redundancy check | 32 bits used to ensure frame integrity. |
| End Delimiter | 2 symbols (sextets) of continuous ones. |
| Abort symbol | 2 symbols (sextets) of continuous zeroes. |

The frames are distributed among the four channels by breaking up the address, data, Type/Length and Cyclic Redundancy Check (CRC) segments and multiplexing this information. The first 5 bits are coded into a 6 bit symbol and transmitted onto channel 0. The second 5 bits are coded into a 6 bit symbol and transmitted onto channel 1, and so on. CRC is generated based upon the data frame's bit sequence, and compared on the receive end after de-multiplexing the frame.

Because data is typically bounded on octet boundaries, and the symbols are gathered on quintet boundaries, it is likely that a few extra bits will be stuffed into the final symbol to ensure encoding on proper boundaries. When the data is returned to octet boundaries, those bits will be pushed into oblivion, thus making the recovery of the data complete.

Table 3 below gives control symbols used in the frame format (described below) used at the physical layer in the preferred embodiment.

TABLE 3

| | | | |
|---|---|---|---|
| End Delimiter (ED) | 111111 | 6 | 111111 |
| Preamble (PREAMBLE) | 010101 | 3 | 010101 |
| Start Delimiter (SD) | 100101 | 3 | 100101 |
| Abort Symbol (ABORT) | 000000 | 0 | 000000 |

The code according to the preferred embodiment provides for a 15 megahertz tone on PREAMBLE which will allow the minimum time for clock synchronization. Further, the code uses the same symbols in the data stream, but makes the decision that PREAMBLE/SD is only being looked for immediately after energy is detected on the link.

The transition from PREAMBLE into SD1 is designated by a "11" or "00" occurrence, and the SD symbol is balanced. The probability of misdetection can be reduced by requiring that the transceiver will not pass any received bits through until the clock has been secured, and by requiring six valid preamble bits to occur prior to accepting a valid SD. Inversion of the data stream can be determined by the polarity of the PREAMBLE-SD symbol boundary.

The End Delimiter is composed of all ones, and would be two such symbols back to back. This provides a sequence of twelve consecutive ones which cannot be generated by any valid data pattern. If a bit error occurs in the ED, it would appear as an invalid symbol.

The ABORT symbol is provided to allow HUB-to-HUB data transfers to be dropped with minimal effort. If a valid ED has not occurred, and two consecutive ABORT symbols appear, the receiving node considers the packet dropped.

The physical layer according to the preferred embodiment also includes scrambling. Scrambling is necessary to provide for clock recovery. In order to provide a system that operates within minimal excessive bandwidth (approximately 35%), a very low bandwidth PLL is required. This means that the distribution of spectral components must be random in order to prevent clock drift.

Scrambling is also necessary to provide for crosstalk reduction. By spreading the energy in the transmitted signal, it has been found that crosstalk is reduced by a few dB. This improves the signal to noise ratio (SNR) of the system. Scrambling is also necessary to provide for emissions reduction.

For the preferred embodiment of the present invention, a stream cypher of 11 bits provides the spectral dispersion necessary to ensure the above characteristics are met. Unlike a synchronous scrambler, the stream cypher does not propagate errors, nor does it exhibit the potential to "lockup". The primary issue with stream cyphers has to do with synchronization. Since the data out of the cypher is a function of the incoming data and a pseudo random bit sequence (PRBS) of a time-dependent value, it is necessary on the receive end to know exactly what point in the sequence the data is associated with. This can be done by using a cypher on the data and presetting the cypher before performing an XOR function on its contents with the data. The polynomial factors are S[n]=1+S[n−9]+S[n−11]. The four channels each have a different cypher which is initialized to a different quadrant of the PRBS to avoid the likelihood of common patterns on each wire.

Figure 12:
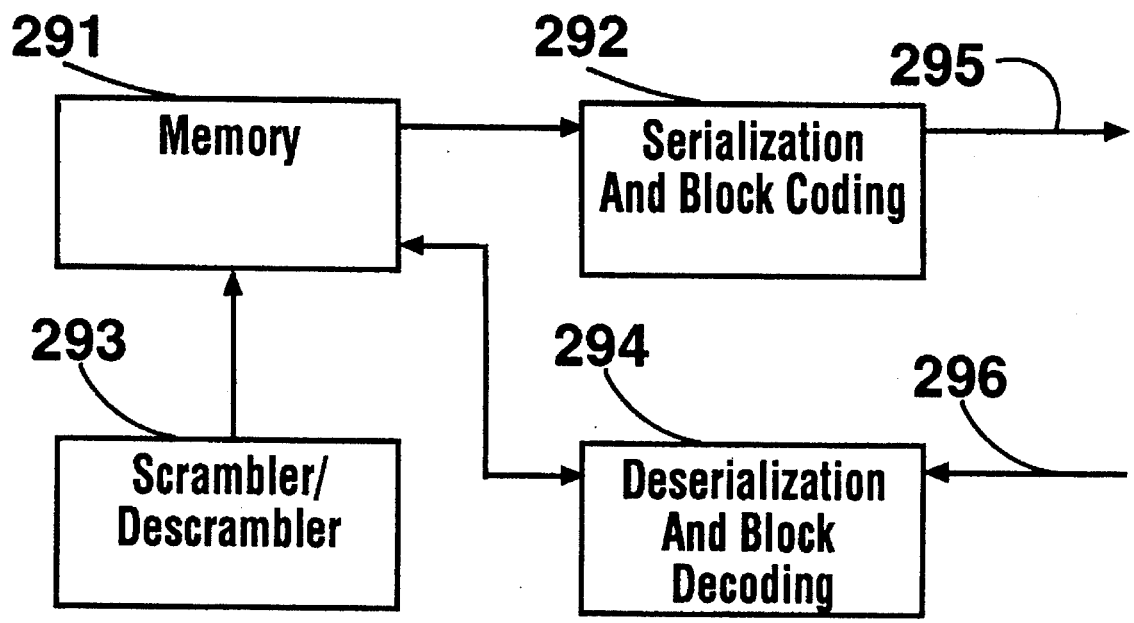
FIG. 12 shows logic blocks within a network interface which prepare data to be forwarded to a hub in accordance with the preferred embodiment of the present invention.

FIG. 12 shows logic blocks within network interface which prepare data to be forwarded to hub 30. A scrambler/descrambler 293 scrambles message, residing in a memory 291, which are to be forwarded to hub 30. Scrambler/descrambler 293 descrambles message, residing in memory 291, which have been received from hub 30. Serialization and block coding logic 292 block codes and serializes scrambled data which is then forwarded to hub 30 via a data path 295. Deserialization and block decoding logic 293 deserializes and block decodes scrambled data which is received from hub 30 via a data path 296.

Figure 13:
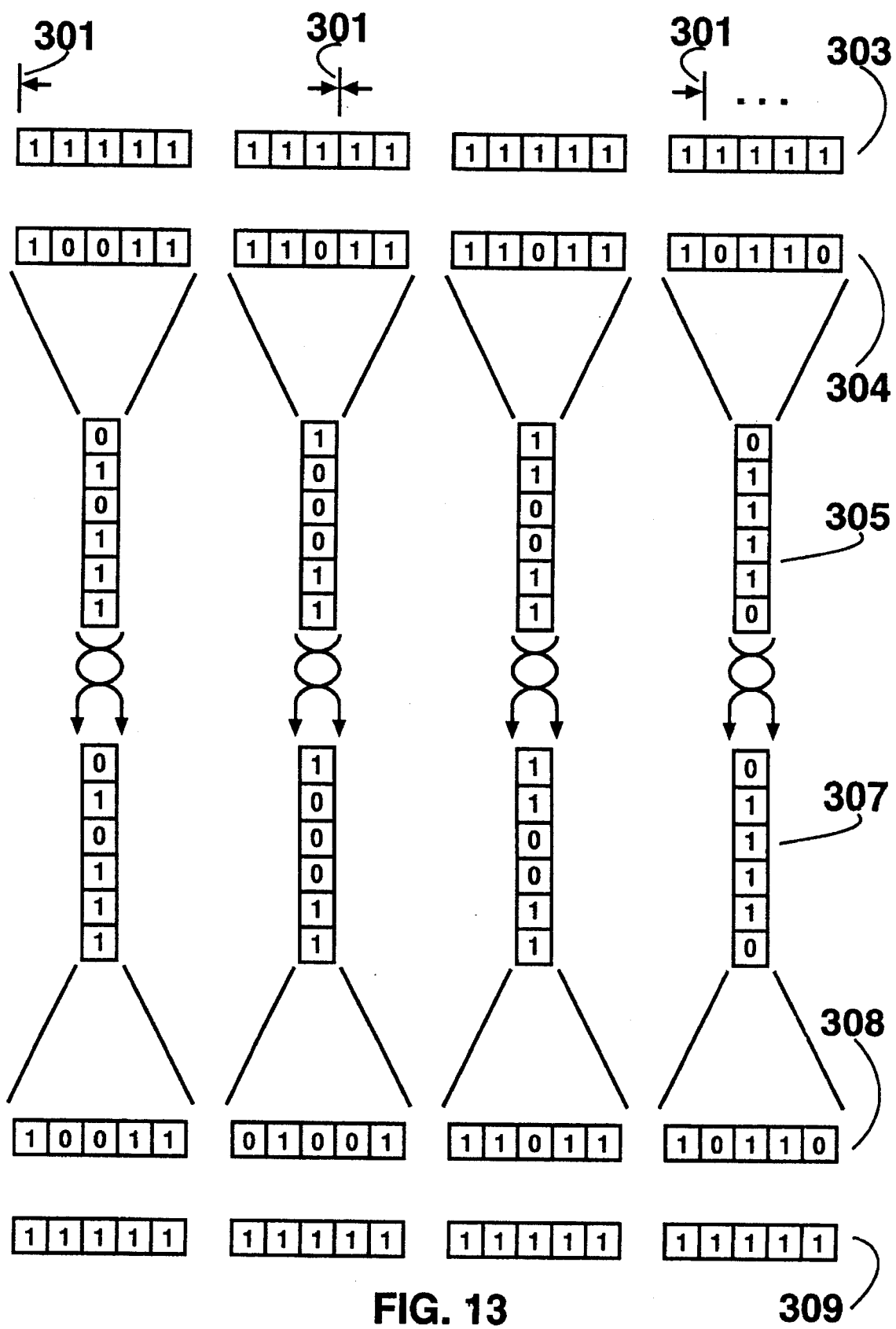
FIG. 13 shows a diagram which explains data flow within the logic blocks shown in FIG. 12 in accordance with the preferred embodiment of the present invention

FIG. 13 shows a diagram which explains data flow within the logic blocks shown in FIG. 12. A row of twenty bits 303 are shown in groups of five bits. Byte boundaries 301 show where byte boundaries for the twenty bits would exist in memory 291. Scrambling bits 303 yields a row of twenty bits 304. Bits 304 are serialized and block coded to produce four serial data streams 305 of six bits each. Each data stream is packetized and put onto a separate twisted pair. After being sent across local area network 12, a network device receives and depacketizes four serial data streams 307 which are identical to data streams 305. Streams 307 are deserialized and decoded to produce a row of twenty data bits 308. Data bits 308 are then descrambled to produce a row of twenty data bits 309. Data bits 309 are identical to data bits 303.

In order to maximize data flow in network 12 and avoid crosstalk, using four twisted wire pairs, for data channels, half-duplex data channel is used. However, full duplex is used for control/status channels. This allows for noise immunity comparable to IEEE 10 BASE-T standards. Using four twisted-pairs in a 10-BASE-T cable and half-duplex transmission, 25 megabyte throughput is required through each twisted wire pair.

In order to maintain adequate noise immunity, the channel bandwidth must not be significantly increased. Through empirical measurements, it has been determined that crosstalk is acceptable when system bandwidth is kept below 21 Megahertz. In addition, a simple binary (two level) code provides lower cost implementation.

Operating with a two level NRZ block code of reasonable efficiency, the bandwidth of the system can be constrained to less than 21 megahertz. This keeps noise down, and the two level code provides robust noise-immunity. The block code must be balanced and efficiency must be above 80%. Therefore, as discussed above, a 5B/6B block code is used.

This enabling scheme utilized by the present invention allows various other protocols to operate by either doing a 25 megabit full duplex channel on two-pairs (e.g., as in 25 megabit 10 BASE-T), a 50 Megabit full duplex communication channel on four-pairs (e.g., as in 50 megabit 10-BASE-T, or 45 megabit ATM), or dual-100 Megabit channels on separate four-pair cables (e.g., as in FDDI, ATM).

Control/status information is full duplex in order to keep latency down. Therefore, it is possible to use two pairs for upstream communication, and two pairs for downstream communications. The transition rate of these channels is kept very low in order to minimize crosstalk effects on adjacent wires. By using tones of 0.9375 megahertz–3.75 megahertz crosstalk in bundles is minimized. Three tones per wire (plus a lack of tones) can allow up to ten different control status signals.

In the preferred embodiment, eight line states are provided by the transceiver state machine. For the purposes of the description below, hub 30 is the master and the network devices are the slaves. Table 4 below summarizes the extant line signals.

TABLE 4

| CODE | SLAVE | MASTER | TX PR 1 | TX PR 0 | RX PR 1 | RX PR 0 |
|------|-------|--------|---------|---------|---------|---------|
| 000 | SILENCE | SILENCE | 0 | 0 | 0 | 0 |
| 001 | IDLE | IDLE | 16 | 16 | 15–17 | 15–17 |
| 010 | REQ 0 | N/A | 16 | 8 | 15–17 | 7–9 |
| 011 | REQ 1 | SYNCH | 8 | 16 | 7–9 | 15–17 |
| 100 | T IDLE | T IDLE | 8 | 8 | 7–9 | 7–9 |
| 101 | RSVD | Incoming | 16 | 4 | 15–17 | 3–5 |
| 110 | RSVD | RSVD | 4 | 16 | 3–5 | 15–17 |
| 111 | RSVD | RSVD | 8 | 4 | 7–9 | 3–5 |

The listed transmits numbers (under TX PR 1 and TX PR 0) are the number of clock cycles each pulse contains. The listed receive numbers (under RX PR 1 and RX PR 0) account for sampling error.

Line state (Code 000) provides for the transmitter to be turned off completely. As seen by Table 4, the first transmitter wire pair (TX PR 0), the second transmitter wire pair (TX PR 1) the first receiver wire pair (RX PR 0) and the second receiver wire pair (TX PR 2) are all at 0 (i.e., silent). In the event that the MASTER detects silence on it's receiver for an extended period of time, it will transmit silence to prevent transmitting onto an unterminated line. The SLAVE and the MASTER indicate SILENCE in the event they are about to begin reception of data. The SILENCE state allows for the twisted pair media to settle before data is inserted onto the wires.

Line state (001) indicates that the SLAVE and MASTER are connected, and the link is inactive. The state is entered upon the end of a data transmission in one of two ways. In the event of a proper transmission, the ETD/ABORT sequence would create the first IDLE symbol which would tell the receiver on the opposite end of the link to disable it's data reception circuits. In the event of an aborted frame, the ETD would not appear, and the ABORT symbol would provide the first component of the IDLE tone.

Line state (010) is used by the SLAVE node to indicate a low priority request. Line state (011) is used by the SLAVE node to indicate a high priority request. This line state is used by the MASTER node to provide a synchronization pulse to end nodes.

Line state (100) is used to initiate a link connection sequence by the SLAVE node. Upon detection of this tone, the MASTER will indicate T IDLE which will indicate to the SLAVE that a connection exists. Then, the connection arbitration cycle (training) is then executed. Line states (101,110,111) are not implemented in the preferred embodiment.

In a preferred embodiment of the present invention, the network device (client) transmits on pairs 0,1 and the hub transmits on pairs 2 and 3. Three frequencies, 0.975 MHz, 1.85 MHz and 3.75 MHz are used. Table 4 gives assigned control signals for the preferred embodiment.

The transceivers within hub 30 and network interface 41 generate and measure frequency of the tones. The acknowledge from the hub to a network device is not a tone frequency pair. Rather it is the event of the transition from the hub driving a tone to the hub driving no signal.

Figure 14:
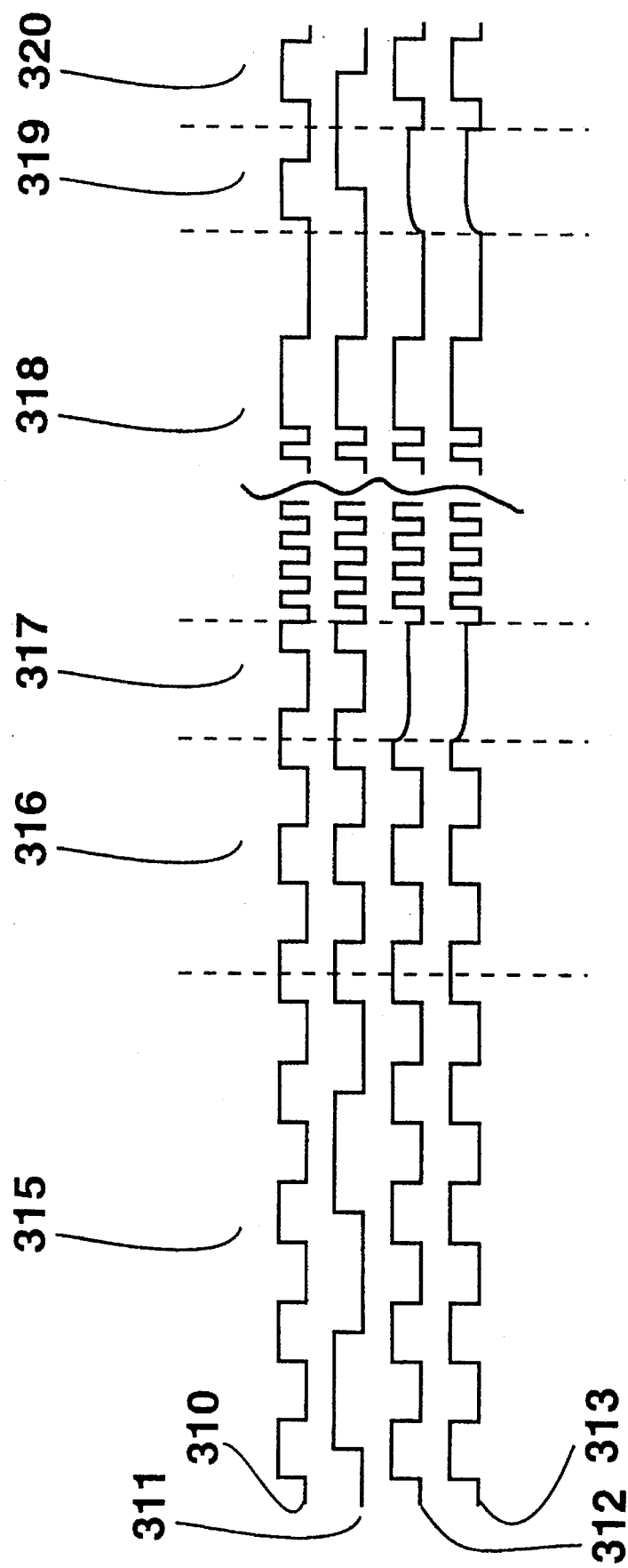
FIG. 14 is a timing diagram showing the timing of signals through a group of four twisted pairs of copper wires in accordance with a preferred embodiment of the present invention.

FIG. 14 is a simplified timing diagram which illustrates a transaction on four pairs. For the example transaction, two frequencies, e.g. one megahertz and two megahertz, are used. The network device (client) transmits on pairs 0,1 and the hub transmits on pairs 2 and 3. Table 5 below gives the assigned control signals for a preferred embodiment.

TABLE 5

| Frequency of Tone Oscillation | | Signaled Control Signal | |
|---|---|---|---|
| First Pair (0 or 2) | Second Pair (1 or 3) | Client | Hub |
| 1 MHz | 1 MHz | Req 0 | Busy |
| 1 MHz | 2 MHz | T-Idle | T-Idle |
| 2 MHz | 1 MHz | Idle | Incoming |
| 2 MHz | 2 MHz | Req 0 | Idle |

The transceivers within hub 30 and network interface 41 generate and measure frequency of the tones. The acknowledge from the hub to a network device in not a tone frequency pair. Rather it is the event of the transition from the hub driving an IDLE to the hub driving no signal.

In FIG. 14, signal waveform 310 represents a signal on a first twisted wire pair between network interface 41 and hub 30. A signal waveform 311 represents a signal on a second twisted wire pair between network interface 41 and hub 30. A signal waveform 312 represents a signal on a third twisted wire pair between network interface 41 and hub 30. A signal waveform 313 represents a signal on a fourth twisted wire pair between network interface 41 and hub 30.

In a time period 315, network interface 41 is driving an idle signal on the first and second twisted wire pairs. Likewise, hub 30 is driving an idle signal on the third and fourth twisted wire pairs.

In a time period 316, network interface 41 is driving a request signal on the first and second twisted wire pairs. Hub 30 continues driving an idle signal on the third and fourth twisted wire pairs.

In a time period 317, hub 30 acknowledges the requested by allowing signals on the third and fourth twisted wire pairs to float to a middle voltage.

In a time period 318, network interface 41 transmits a data packet on all four twisted wire pairs.

In a time period 319, the end of packet has been reached. Network interface 41 stops driving the third and fourth twisted wire pairs. Network 41 starts driving an idle signal on the first and second twisted wire pairs.

In a time period 320, network interface 41 continues driving an idle signal on the first and second twisted wire pairs. Hub 30 begins driving an idle signal on the third and fourth twisted wire pairs.

While this example has been for transmission of a single packet, multiple packets may also be transmitted after a single arbitration.

Key constraints of the above described system include the use in a network of four twisted wire pairs to attach each network node to the hub. During data transmission or reception, the direction of data flow on all four twisted wire pairs is in a single direction. It is thus not possible to reliably determine whether two nodes are transmitting simultaneously because there is no way to signal a transmitting node since it is not receiving at that time. In the hardware configuration, twisted wire pairs from several clients can be combined into one cable bundle. Due to near end crosstalk, during data reception, the hub is not allowed to transmit the data packet to more than one port. However, the hub may send data packets to multiple ports while the hub is not receiving data packets. Additionally, when the hub is receiving data from one of the network nodes, the hub exchanges control signals with other network nodes. The control signals are tones which are at frequencies well below the data rate.

In order to facilitate the operation of the system over a broad range of possible cables, a period of characterizing of the cable is performed before transmission of user data. This is the training periods described above.

In the preferred embodiment, no existing network protocol is used to arbitrate network usage for this topology. Rather, as described above, a port of the hub is in one of three states at any particular point in time. The first state is where the port is transmitting a packet (four twisted wire pairs driven by client). The second state is where the port is receiving a packet (four twisted wire pairs driven by hub. The third state is during arbitration for a link (two twisted wire pairs driven by client, 2 twisted wire pairs driven the hub). At any one point in time, different ports of the hub can be in different modes, e.g., one port transmitting, one port receiving and the rest arbitrating for the next cycle.

During arbitration, pairs of low frequency tones are sent by the hub and client. These allow the hub and client to determine who gets to transmit next. In addition, other control information may be sent.

During the training sequence the client notifies the hub of its network address. Also, network protocol errors retrigger the training sequence.

To support applications which require low latency and guaranteed network bandwidth availability, two priority levels of client data are supported. These two priority levels are preserved through the bridge to the backbone network.

To avoid packet loss through the bridge, a busy signal which indicates the buffer memory is full is sent to the client that has transmitted a packet which could not be stored. This signal is held until space is available in the bridge buffer. The advantage is that the packet can be retransmitted by the client hardware without depending on a software protocol timeout to retransmit.

To address the limitation of transmitting to only one client, the following method is used during reception of a packet. During reception of a packet, the repeater identifies the destination client before transmitting the packet. The data is transmitted to that port only. This has the added benefit of providing protection against an eavesdropping node. The hub does not fully receive the packet before retransmitting it. In the event the packet is intended for multiple destinations, the packet is buffered in the repeater and then retransmitted once it has been fully received.

During network operation, the hub checks all ports for requests. The following priority is used. Highest priority is granted high priority messages from the backbone. The next highest priority is granted high priority local messages. Then priority is granted to data priority messages from the backbone. Lowest priority is granted to data priority messages from the local network. When there are multiple clients requesting at the same priority level, they are satisfied in a round robin order.

The advantages of the above described embodiment of the present invention include good support for bridging, multiple priority levels and a predictable arbitration method under heavy loads.

Various preferred embodiments of the present invention can be adapted for use with various protocols. For example, preferred embodiments may be adapted to run similar to the IEEE 802.3 protocol. In one such embodiment, at the start of a packet, a client transmits on pairs 1 and 2. The hub repeats the data onto pairs 3 and 4 to the other clients. The transmitting client monitors pairs 3 and 4 for activity and the hub monitors pairs 1 and 2 for activity. Once the 802.3 arbitration has completed without a collision, i.e. the slot time has passed, the client is able to transmit on all 4 pairs. The 802.3 arbitration state machine can be used in a form to the version described above.

In an alternate embodiment, the client, at the start of a packet transmits on a first set of twisted wire pairs 1,2,3 and the hub repeats on a second set of twisted wire pairs 2,3,4. The client monitors pair 4 for activity and the hub monitors pair I for activity. After the arbitration is complete, the client can transmit data on all four twisted wire pairs.

Alternately, after the arbitration is complete the client can continue to transmit on only three pairs; however, in order to maintain a 100 megabit transmit throughput over the network, the transmission rate through each twisted wire pair would need to be correspondingly increased. For example, in order to transmit at 100 megabits on three lines with a 5B/6B two level code would require 40 megabauds per twisted pair, i.e., a maximum bandwidth per twisted pair of approximately 25–30 MHz.

In networks where bundles of twisted wire pairs are used, during arbitration a low frequency preamble is sent because data frequencies would generate too much crosstalk. If bundles are not used, the packet is transmitted during the arbitration at half or three quarters the final data rate, depending on whether 2 or 3 pairs are available.

In order to implement training in such an embodiment, a method similar to that described in the above described training state machines is used. In such an embodiment, for example, idle signals are sent on the cable to indicate whether a port has been trained or not. Until the training is complete, the port is not allowed to send regular packets.

The above-described embodiment of the invention has utilized a protocol in which for control signals tones are transmitted in full duplex at low frequency relative to data signals which are transmitted in half duplex. However, alternate embodiments of the present invention allow for additional adaptations to existing protocols. For example, for protocols which require collision detection, such as IEEE 802.3 protocol, various alternate embodiments may be implemented in accordance with the present invention.

For example out of band signaling may be used. Collision information is propagated back to the end node with a frequency that can be filtered out from the data stream. A low or high frequency could be used. Even a DC signal could be sent back on one pair to indicate collision. This would allow the data packet t be sent on all 4 pairs immediately, thus increasing network efficiency.

FIG. 15 gives one block diagram of an implementation which allows collision detection by sending collision information over a different frequency than data. A data signal generator 331 operating at a first frequency range is connected in parallel to a collision signal generator 332 and a resistance 333. Collision signal generator 332 generates a collision signal at a frequency different than the first frequency range used for data. Data signals and collision signals are transmitted through transformer 334, over a twisted wire pair 335 and through a transformer 337. In parallel with a resistance 337 a filter 338 for data frequencies forwards the data signals using an amplifier 340. Likewise, a filter 339 for the collision frequency 339 forwards the collision signal using an amplifier 341.

FIG. 16 and FIG. 17 show potential frequency spectrums for signals sent across twisted pair 335. Data signals are in a range between a first frequency f1 and a second frequency f2. Collision signals are sent a frequency f3. FIG. 16, illustrates the case where the spectrum for data frequencies 346 are at lower frequencies than the spectrum for collision frequency 347. FIG. 17, illustrates the case where the spectrum for data frequencies 346 are at higher frequencies than the spectrum for collision frequency 347.

Alternately, common-Mode signaling may be used. In this case, the twisted wire pairs carry the data stream with differential mode signaling. Again, all 4 twisted wire pairs send data immediately, and collision signaling is sent back at a common mode signal on one pair. Alternately, radio frequency interference (RFI) is minimized by sending a common mode AC signal on two twisted wire pairs simultaneously. The AC signal is 180 degrees out of phase on each pair to cancel the electromagnetic fields created by a single transmitter.

Figure 18:
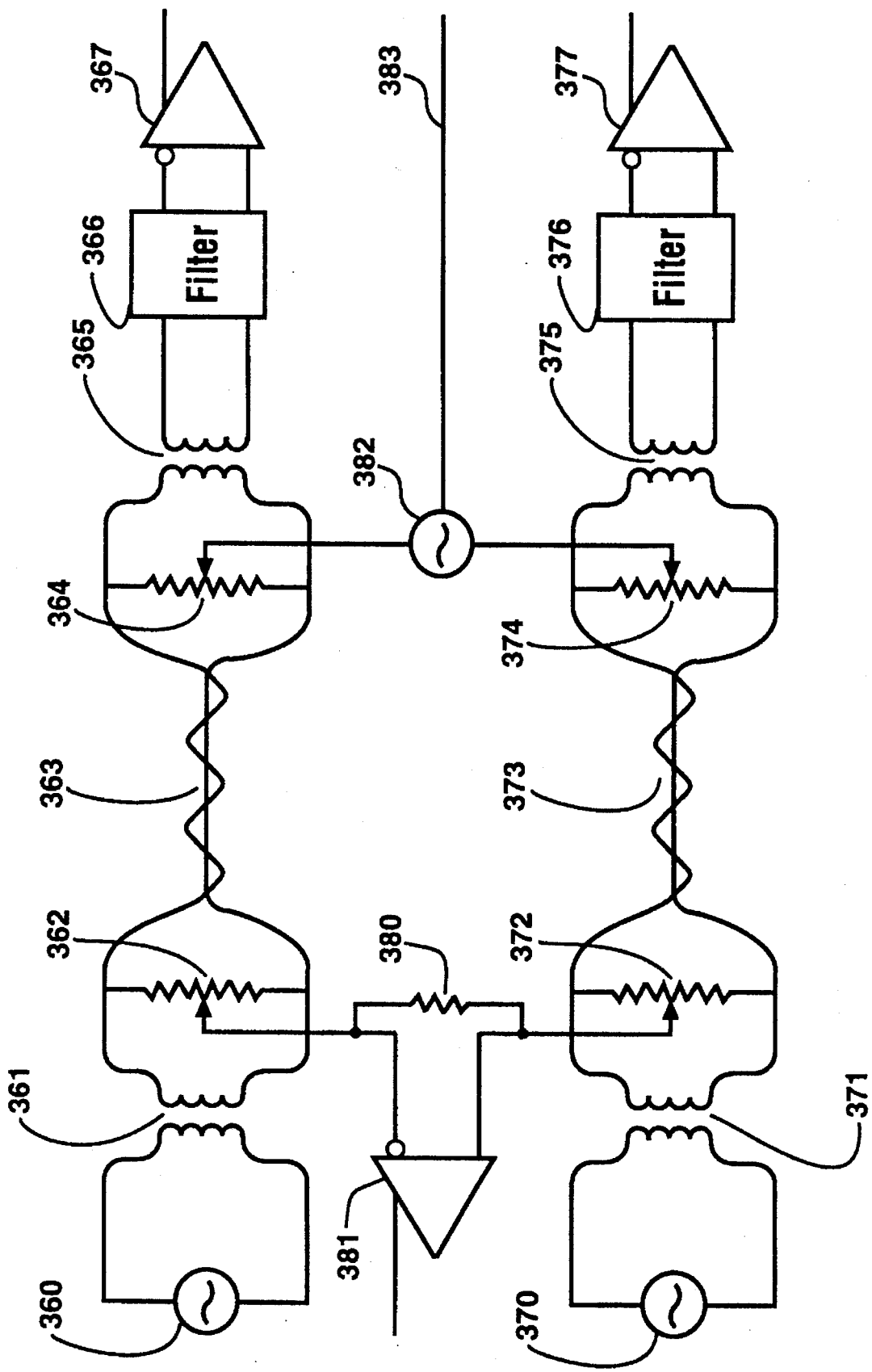
FIG. 18 shows a block diagram of a circuit which provides common-mode collision signaling in a network in accordance with a preferred embodiment of the present invention.

FIG. 18 shows a block diagram of an implementation which provides common-mode collision signaling. A data signal generator 360 transmits data signals through transformer 361, over a twisted wire pair 363 and through a transformer 365. A filter 366 forwards the data signals using an amplifier 367. Likewise, a data signal generator 370 transmits data signals through transformer 371, over a twisted wire pair 373 and through a transformer 375. A filter 376 forwards the data signals using an amplifier 377. A collision generator 382 is connected to a transmission resistance 364 and a transmission resistance 374. In response to an enable signal on a line 383, collision generator 382 generates a differential signal through twisted wire pair 363 and twisted wire pair 373. A collision detector consisting of an amplifier 381 and a resistance 380 is coupled between a reception resistance 362 and a reception resistance 372. The collision detector detects and forwards a collision signal generated by collision generator 382.

In an alternate embodiment, in band signaling can be used. In this embodiment, collision information is driven to a transmitting node with an in band frequency signal. The receiving node has a hybrid transformer that allows echo cancellation of the outgoing data stream. The network node is thus able to verify a received collision signal in addition to the data being sent. Also, active circuits which provide echo cancellation may be used which allows half duplex signaling on a four twisted wire pairs.

Figure 19:
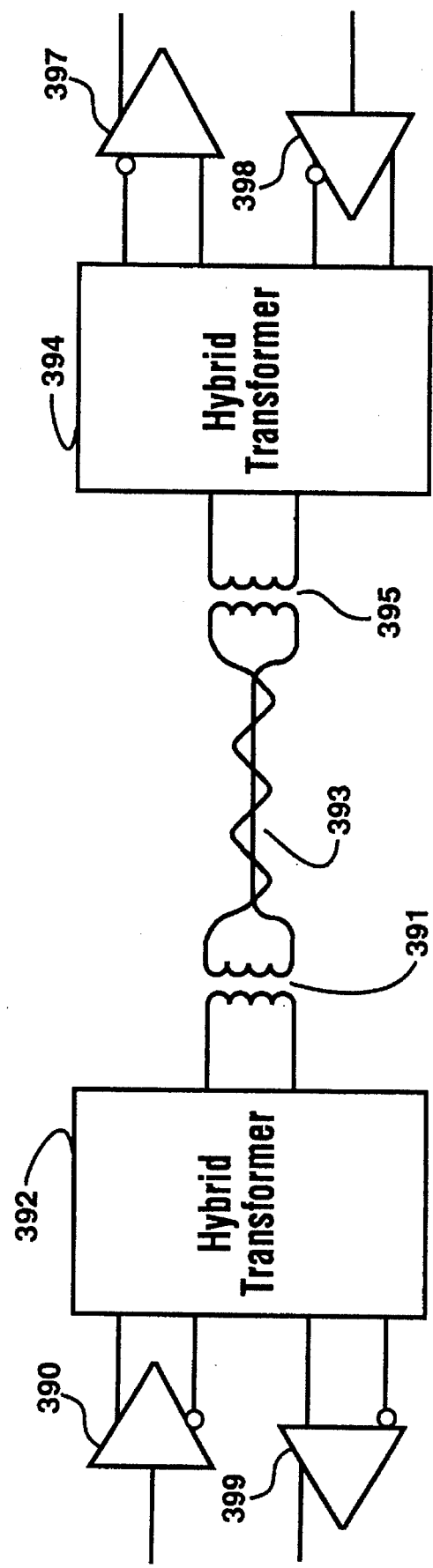
FIG. 19 shows a block diagram of a circuit which provides in-band collision signaling in a network in accordance with a preferred embodiment of the present invention.

FIG. 19 shows a block diagram of an implementation which provides for in-band collision signaling. A transmit amplifier 390 transmits data signals through a transformer 391 over a twisted wire pair 393 and through a transformer 395 to an amplifier 397. Likewise, a transmit amplifier 398 transmits data signals through transformer 395 over twisted wire pair 393 and through transformer 391 to an amplifier 399. A hybrid transformer 392 and a hybrid transformer 394 serve to cancel energy from being received by a nodes own transmitter, However, hybrid transformer 392 and hybrid transformer 394 will not block the incoming reception from another node. If in either case, a node is transmitting and receiving data at the same time, this indicates a collision has occurred.

Figure 20:
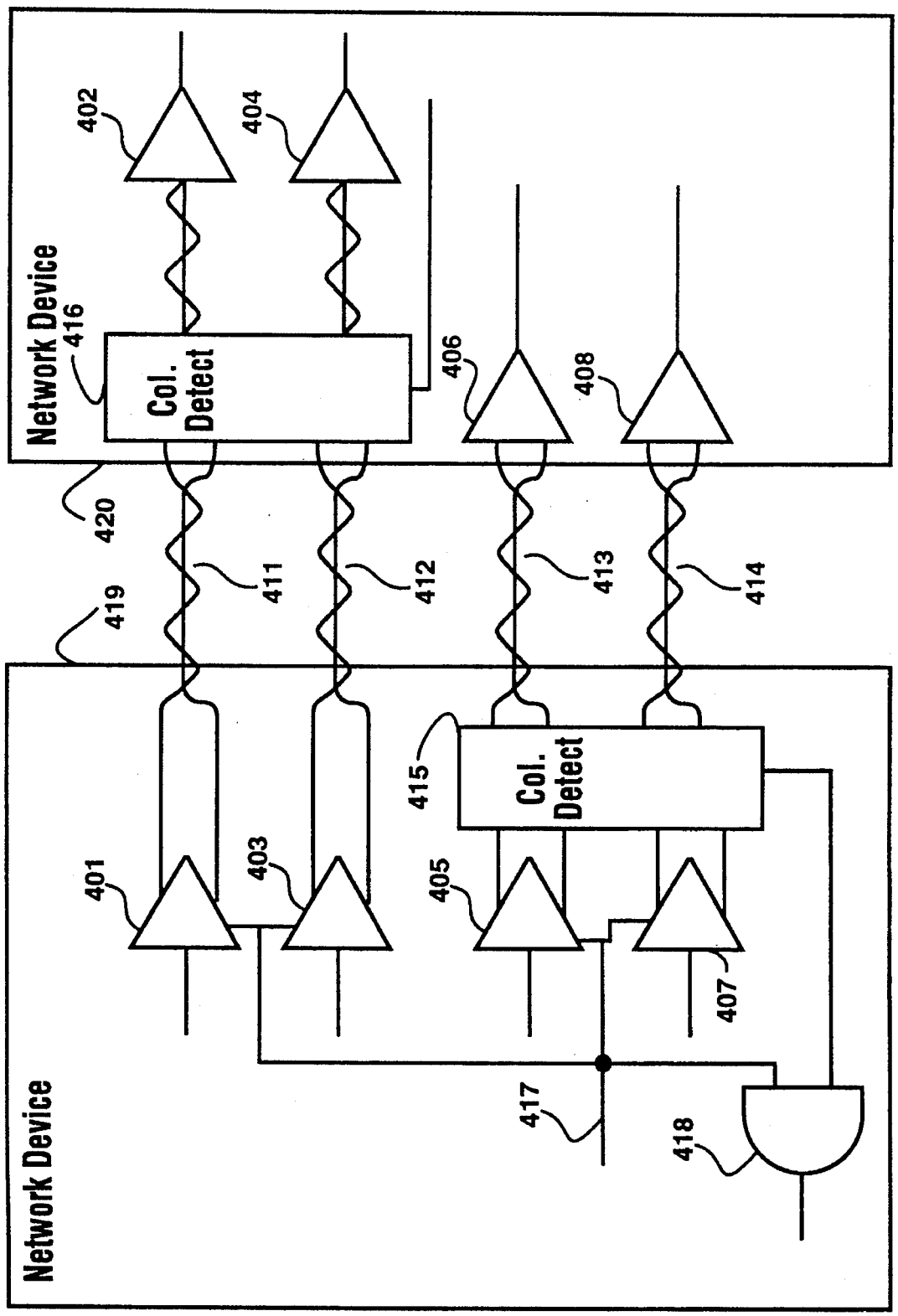
FIG. 20 is a block diagram which shows how the implementation circuit in FIG. 15 or the circuit shown in FIG. 18 may be used in a network where a network device sends data to a network device over four twisted wire pairs in accordance with a preferred embodiment of the present invention.

FIG. 20 shows how the implementation shown in FIG. 15, or the implementation shown in FIG. 18 could be used in a network where a network device 419 sends data to a network device 420 over four twisted wire pairs 411, 412, 413 and 414. Within network device 419, a transmitting amplifier 401 sends data over twisted wire pair 411, a transmitting amplifier 403 sends data over twisted wire pair 412, a transmitting amplifier 405 sends data over twisted wire pair 413 and a transmitting amplifier 407 sends data over twisted wire pair 414. Within network device 420, a receiving amplifier 402 receives data over twisted wire pair 411, a receiving amplifier 404 receives data over twisted wire pair 412, a receiving amplifier 406 receives data over twisted wire pair 414 and a receiving amplifier 408 receives data over twisted wire pair 415.

Collision detection is accomplished, for example, using a separate frequency as in the implementation shown in FIG. 15 or FIG. 18. Collision detection circuitry 415 within network device 419 detects collisions by listening for a collision signal sent on twisted wire pair 413 and/or twisted wire pair 414. Collision detection circuitry 416 within network device 420 detects collisions by listening for a collision signal sent on twisted wire pair 411 and/or twisted wire pair 412.

In this embodiment, when network device 419 desires control of the network, network device 419 begins transmission on all of twisted wire pairs 411, 412, 413 and 414. In addition, network device 419 sends a collision signal on one or both of twisted wire pairs 411 and 412. Collision detection circuitry 415 then listens for a collision signal on twisted wire pair 413 and 414. When a transmit enable signal 417 and a collision detection signal from collision detection circuitry 415 are both activated, a logical AND gate 418 signals a collision.

In another alternate embodiment, time multiplexing is used. In this embodiment the network nodes transmit on all four twisted wire pairs. After making an initial transmission, transmission ceases or a low frequency tone is sent during a collision window period. The collision window is used by the repeater to signal that a collision on the network has occurred. The original transmitting node would continue with packet transmission if no collision signal is returned during the collision window. Otherwise, the network node will back off, for example, in accordance with the IEEE 802.3 backoff algorithm. The use of a low frequency tone (or single tone) allows the collision signal to be sent back as a different tone. This allows a simple frequency detection circuit to be used to detect the collision tone.

Figure 21:
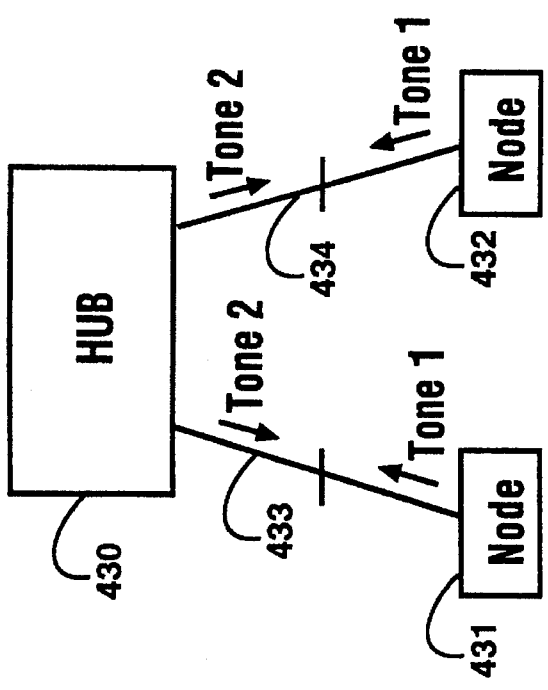
FIG. 21 shows a hub connected to network nodes through four twisted wire pairs in accordance with a preferred embodiment of the present invention.

FIG. 21 shows a hub 430 connected to a node 431 through four twisted wire pairs 433. Hub 430 is connected to a node 432 through four twisted wire pairs 434. In a time multiplexed hub based collision detection scheme, each node desiring to send information sends first tones during a collision interval. Hub 30 listens for the tones. If tones from more than one node is heard, hub 30 sends to all nodes a second tone indicating a collision has been detected.

Figure 22:
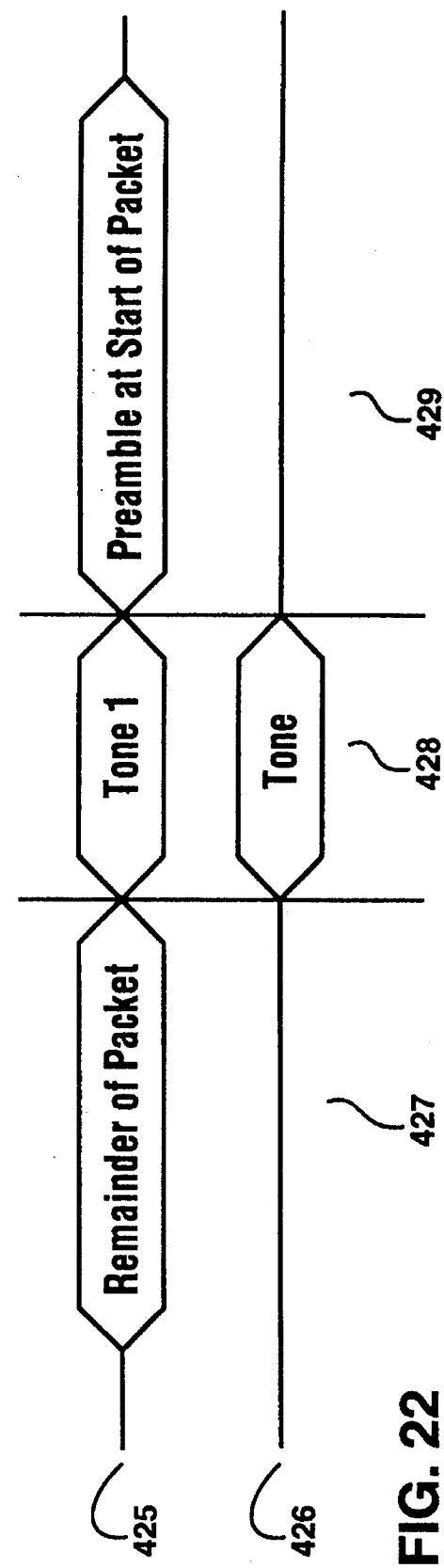
FIG. 22 shows an example of signal timing packages within a network in accordance with a preferred embodiment of the present invention.

FIG. 22 shows an example of signal timing packages used in a time-multiplexing scheme. Signal line 425 represents potential signals sent by node 431. Signal line 426 represents potential signals sent by hub 30. In a time period 427, node 431 finishes a sending a last data packet over four twisted wire pairs 433. In a collision detection period 428, node 431 and any other nodes which desire to send data send the first tone to hub 430. If hub 30 detects a collision, hub 30 sends the second tone. Otherwise in a time period 429, node 431 can begin transmission of a new network packet.

In another alternate embodiment of the present invention, a collision signal is sent after the data packet. A modification to the IEEE 802 3 protocol in accordance with this embodiment allows half-duplex operation on all 4 twisted wire pairs immediately for each data transmission. When transmitting a packet, a network node transmits a complete packet using all four twisted pairs. At the end of the packet, a collision window is opened by all nodes, allowing the repeater (Hub) to send a collision signal back to the original transmitting nodes. A network with low collision counts can have a significant increase in throughput efficiency by allowing all four pairs to transmit at the beginning of the data packet, as allowed by this embodiment.

Figure 23:
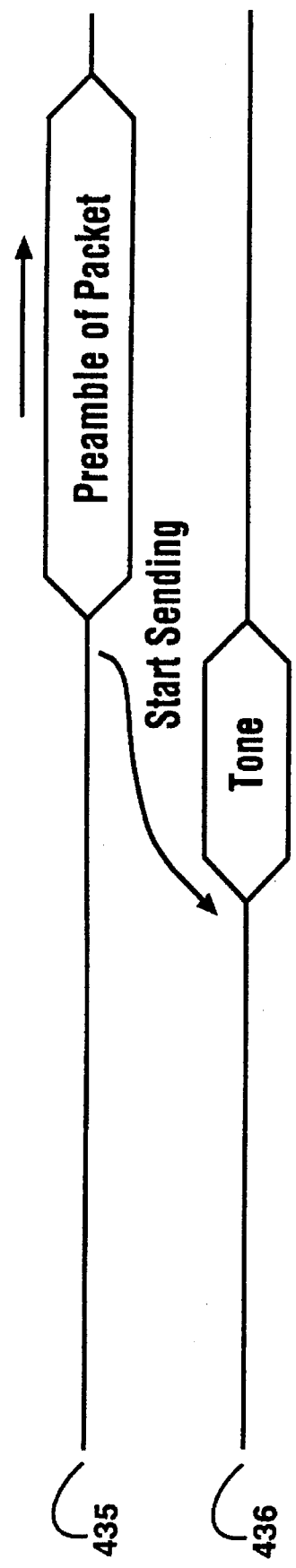
FIG. 23 shows an example of signal timing packages within a network in accordance with an alternate preferred embodiment of the present invention.

FIG. 23 shows signal timing packages for this alternate scheme. Signal line 435 represents potential signals sent by node 431. Signal line 436 represents potential signals sent by hub 30. When there is a collision, a collision indicator (e.g., a tone) is sent to the nodes which collided. All colliding nodes would be informed after the packets were complete. Each node would then back off per the algorithm of the network program, (e.g., the 802.3 protocol).

In the preferred embodiment, a tone preamble occurs during a collision slot time. In this embodiment, a single tone is sent throughout the collision window as the data packet preamble. The single tone allows a collision signal to be sent back at an in band tone of another frequency, allowing ease of collision detection.

Figure 24:
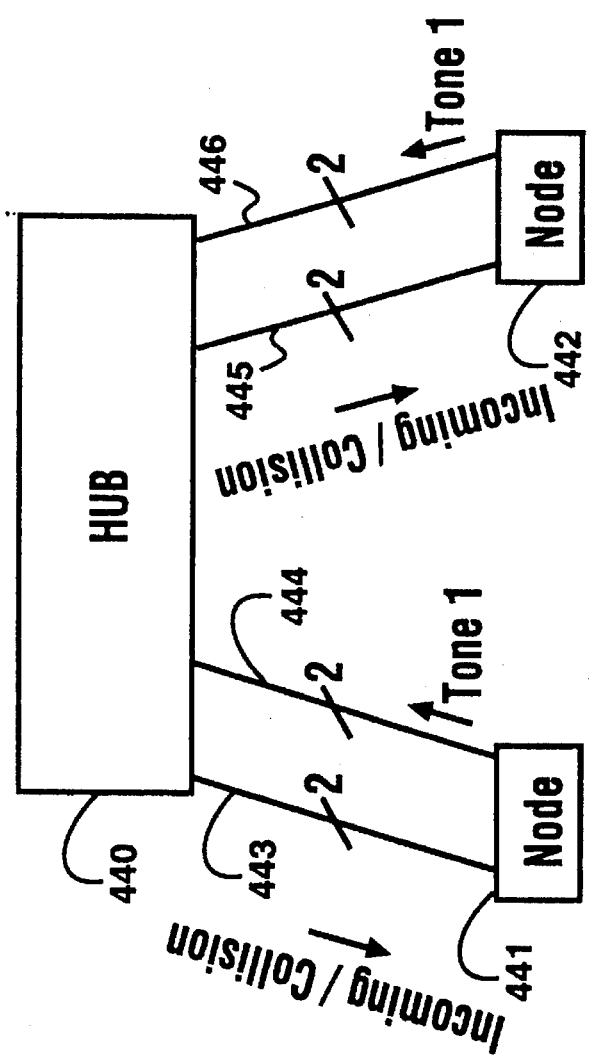
FIG. 24 shows a hub connected to network nodes in a system where there is a collision window before each packet transmission in accordance with a preferred embodiment of the present invention.

FIG. 24 illustrates the case where there is a collision window before each packet transmission. During the collision window, network nodes which desire to transmit data inform a hub 440 by sending first tones to hub 440. For example, a network node 441 sends to hub 440 the first tone over a first set of twisted wire pairs 444. A network node 442 sends to hub 440 the first tone over a first set of twisted wire pairs 446. As soon as hub 440 receives the first tone from any network node will begin sending an incoming signal to all nodes. For example, hub 440 will send an incoming signal to node 44 1 over a second set of twisted wire pairs 443. Hub 440 will send an incoming signal to node 442 over a second set of twisted wire pairs 445. All nodes will then be allowed to make a request to send data for a time duration set by the protocol. Each node measures the time duration from the time the node receives the incoming signal from hub 440. Hub 440 will wait until all possible requests to transmit have been heard. Then, if there has been more than one request to transmit data, hub 440 will send the collision tone in place of the incoming tone. Otherwise, hub 440 will cease transmissions allowing the one node requesting data transmission to proceed with the transmission.

Because of losses when transmitting over twisted wire pairs, low frequency tones have a higher voltage amplitude when received than do higher frequency data signals. In order to take advantage of this, in one embodiment of the present invention, the noise threshold (squelch) is set higher when receiving control tones, and is set lower when receiving data signals.

Figure 25:
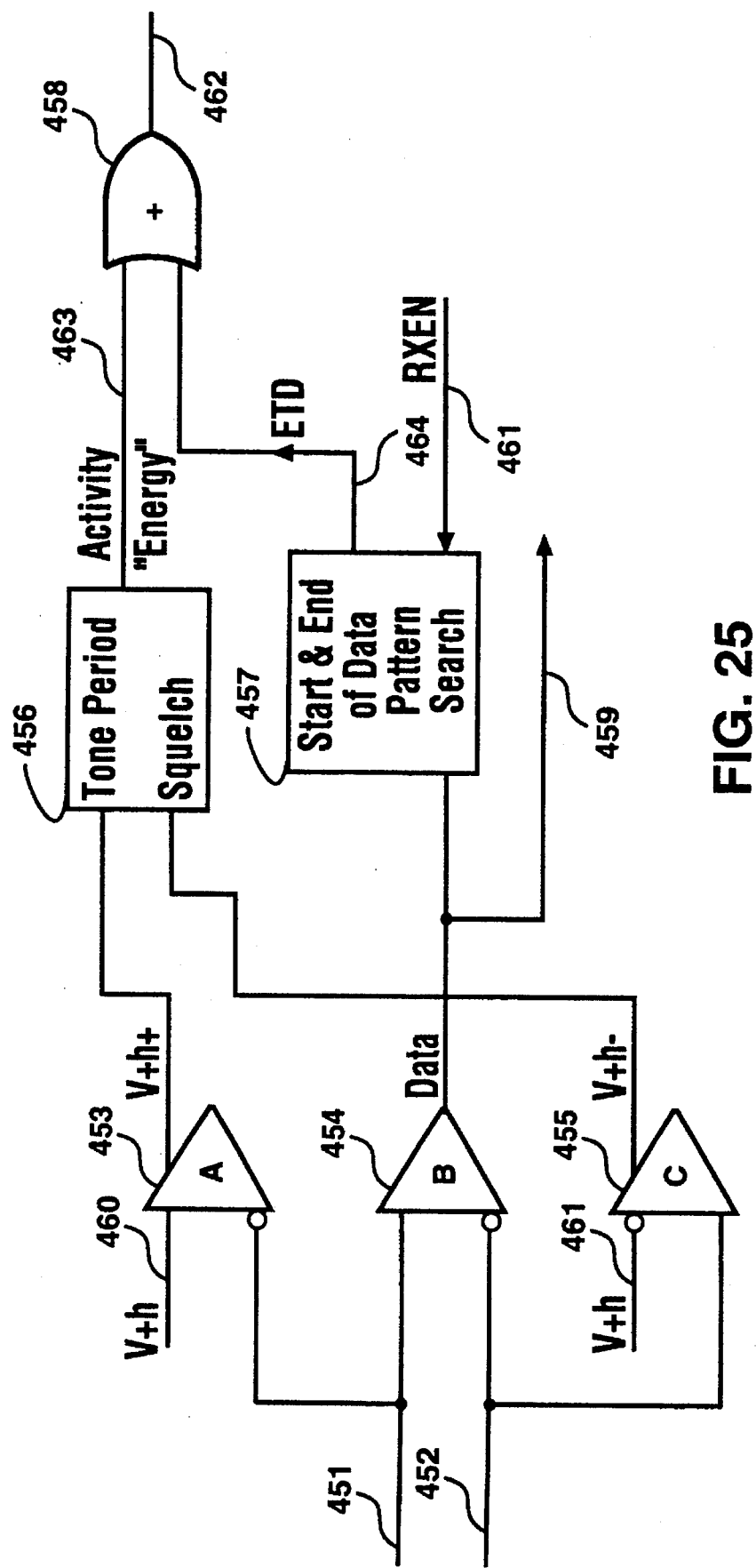
FIG. 25 shows a circuit within a receiving network device which can be used to adjust squelch for information received from a twisted pair in accordance with a preferred embodiment of the present invention.

For example FIG. 25 shows a circuit within a receiving network device which can be used to adjust squelch for information received from a twisted pair. An incoming signal is placed on lines 451 and 452. A comparator 454 compares voltage on lines 451 and 452 and is used supply data on a line 459. Additionally output from comparator 454 is received by start and end of data pattern search logic 457. Logic 457 also receives a receive enable signal (RXEN) on a line 461. A comparator 453 compares the signal on line 451 with a threshold voltage on a line 460. A comparator 455 compares the signal on line 452 with the threshold voltage on a line 461. Output from comparator 453 and comparator 455 are received by tone period squelch logic 456.

When the receiving network device receives from another device a tone which indicates data is to soon be sent to the receiving network device, RXEN is asserted on line 461. At this point the receiving network device listens for the signal voltage transitions detected by comparator 454. This allows for accurate detection of the lower voltage data signals. When logic 457 detects an end of data pattern, the network listens for tone signals based on a squelch with the threshold voltage placed on lines 460 and 461.

A logic OR gate 458 generates on line 462 a link/data OK signal which indicates when data or tones is being reliably received by the receiving network device. Logic OR gate 458 receives an activity energy signal on a line 463 when tones with signal voltages greater than the threshold voltage are detected on lines 451 and 452. Logic OR gate 458 receives an ETD signal from Logic 457 when both RXEN on line 451 is asserted and data transmission is detected by comparator 454. Alternately, logic OR gate 458 may be replaced with a multiplexor controlled by RXEN on line 461.

Figure 26:
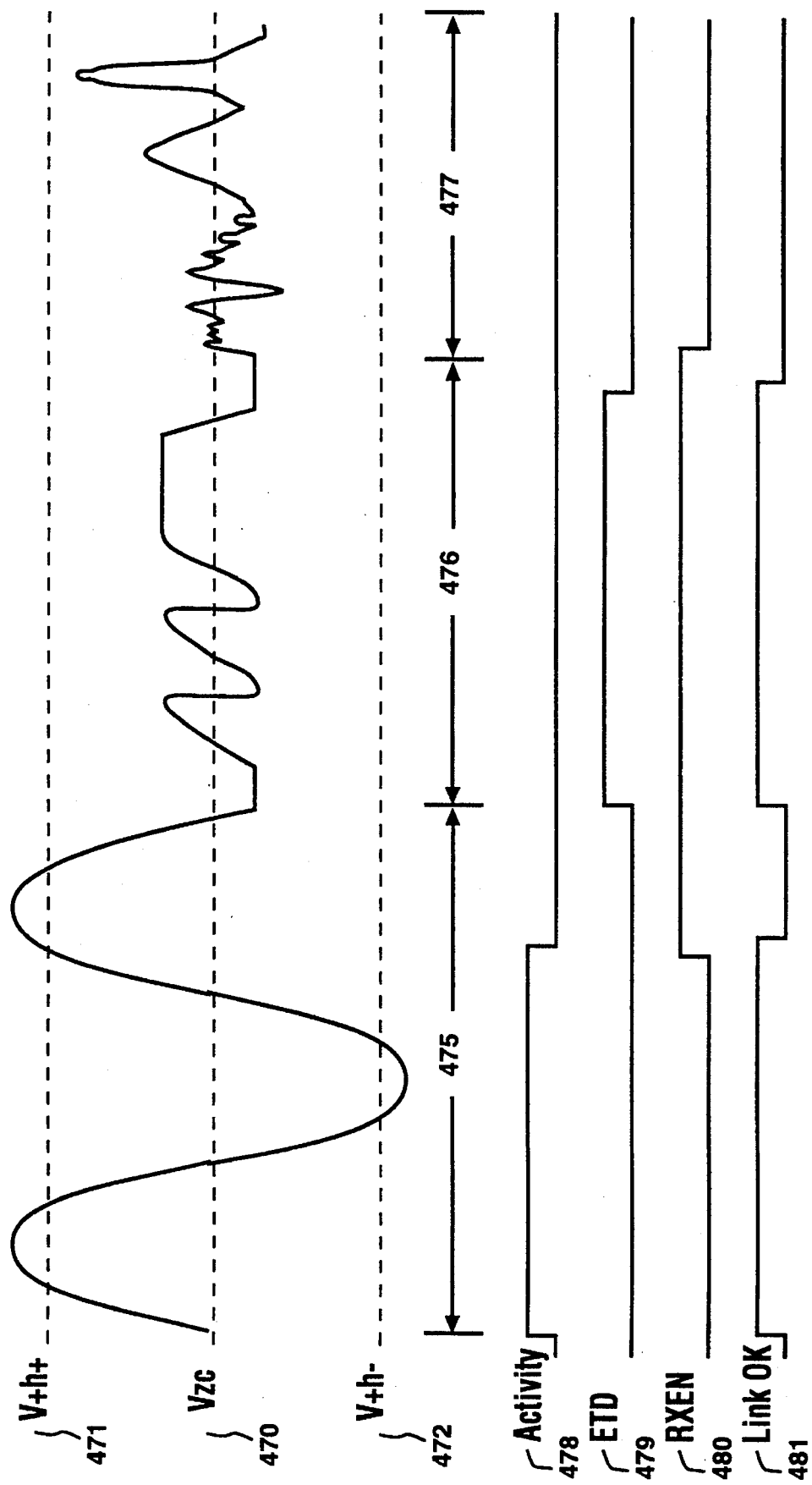
FIG. 26 is a timing diagram which illustrates operation of the circuit shown in FIG. 25 in accordance with a preferred embodiment of the present invention.

FIG. 26 is a timing diagram which illustrates operation of the circuit shown in FIG. 25. A waveform 473 represents voltage variation of signals on line 451 and 452. Waveform 473 is shown in comparison with a zero or midpoint voltage 470, a positive threshold voltage 471 and a negative threshold voltage 472.

During a period 475, a tone signal is received, as is represented by waveform 473. Because the tone signal has a voltage amplitude exceeds the positive and negative voltage threshold, the activity signal on line 463 is asserted, as represented by a waveform 478. Also during period 475, the link OK signal on line 462 is asserted, as represented by a waveform 481. Also at some time within period 475, RXEN is asserted, as illustrated by a waveform 480.

During a period 476, a data signal is received, as is represented by waveform 473. When logic 457 detects the data signal, the ETD signal on line 464 is asserted, as represented by a waveform 480.

During a period 477, the data transmission has ceased and RXEN is de-asserted, using information encoded in the received data stream. The higher threshold is therefore re-enabled. Noise on the line, as represented by waveform 473, is ignored because it does not have a voltage amplitude that exceeds the positive and negative voltage threshold. Therefore, the link OK signal on line 462 is de-asserted, as represented by waveform 481.

The foregoing discussion discloses and describes merely exemplary methods and embodiments of the present invention. As will be understood by those familiar with the art, the invention may be embodied in other specific forms without departing from the spirit or essential characteristics thereof.

For example, the method described above can be modified in order to reduce the possibility of undetectable errors occurring owing to noise bursts affecting all four channels simultaneously and thereby corrupting several successive 5B/6B symbols propagating in parallel through the channels. In this modification the 6B symbols on two channels are offset in time by half the time for transmission of a symbol, relative to the symbols on the remaining two channels. As a result a noise burst affecting the channels for the duration of transmission of up to four bits can corrupt at most six consecutive 5B symbols (thirty consecutive bits). Such corruption can always be detected using a 32-bit CRC code as described herein.

Various different 5B/6B block codes may be used in place of the block code given in Table 1 above. One possible alternate 5B/6B code is shown in Table 6 below.

TABLE 6

| 5-bit data block | 5-bit data block | 6-bit code value | Alternate 6-bit code |
|---|---|---|---|
| 0  | 00000 | 000110 | 11100 |
| 1  | 00001 | 001110 | |
| 2  | 00010 | 110010 | |
| 3  | 00011 | 000111 | |
| 4  | 00100 | 100110 | |
| 5  | 00101 | 010011 | |
| 6  | 00110 | 100001 | 011110 |
| 7  | 00111 | 011000 | 100111 |
| 8  | 01000 | 110100 | |
| 9  | 01001 | 010110 | |
| 10 | 01010 | 000101 | 111010 |
| 11 | 01011 | 100011 | |
| 12 | 01100 | 110001 | |
| 13 | 01101 | 001001 | 110110 |
| 14 | 01110 | 011010 | |
| 15 | 01111 | 010101 | |
| 16 | 10000 | 010100 | 101011 |
| 17 | 10001 | 100100 | 011011 |
| 18 | 10010 | 100101 | |
| 19 | 10011 | 101010 | |
| 20 | 10100 | 001011 | |
| 21 | 10101 | 101001 | |
| 22 | 10110 | 101000 | 010111 |
| 23 | 10111 | 001010 | 110101 |
| 24 | 11000 | 011001 | |
| 25 | 11001 | 101100 | |
| 26 | 11010 | 010010 | 101101 |
| 27 | 11011 | 011100 | |
| 28 | 11100 | 100010 | 101110 |
| 29 | 11101 | 001100 | 110011 |
| 30 | 11110 | 001101 | |
| 31 | 11111 | 111000 | |

Accordingly, the disclosure of the present invention is intended to be illustrative, but not limiting, of the scope of the invention, which is set forth in the following claims.

We claim:

1. A method for transmitting first data across a network, the method comprising the steps of:
   (a) scrambling the first data to produce scrambled data;
   (b) serializing and block coding the scrambled data to produce a plurality of serial data stream, wherein the block coding is performed using a 5B/6B code;
   (c) transmitting the plurality of serial data streams across the network;
   (d) deserializing and block decoding the plurality of serial data streams to recover the scrambled data; and,
   (e) descrambling the scrambled data to recover the first data.

2. A method as in claim 1 wherein step (c) is performed using binary NRZ modulation.

3. A method as in claim 1 wherein in step (a) the scrambling is based on the following polynomial factors:

$$S[n]=1+S[n-9]+S[n-11].$$

4. A method as in claim 1 additionally comprising the following step performed before step (a):
   (f) dividing the first data into a plurality of data streams, wherein step (a) is performed on the plurality of data streams into which the first data is divided.

5. A method as in claim 1 wherein step (a) includes independently scrambling each of the plurality of data streams to produce a plurality of scrambled data streams, and step (b) includes independently serializing and block coding the plurality of scrambled data streams to produce the plurality of serial data streams.

6. A method as in claim 5 wherein in step (b) the plurality of data streams are each block coded before being serialized.

7. A method as in claim 5 wherein in step (b) the scrambled data is block coded before being serialized.

8. A method for transmitting first data across a network, the method comprising the steps of:

(a) dividing the first data into a plurality of data streams;

(b) scrambling the first data to produce scrambled data, wherein step (b) is performed on the plurality of data streams into which the first data is divided, and wherein step (b) includes independently scrambling each of the plurality of data streams to produce a plurality of scrambled data streams;

(c) serializing and block coding the scrambled data to produce a plurality of serial data streams, wherein step (c) includes independently serializing and block coding the plurality of scrambled data streams to produce the plurality of serial data streams, and wherein in step (c) the plurality of scrambled data streams are each block coded before being serialized;

(d) transmitting the plurality of serial data streams across the network;

(e) deserializing and block decoding the plurality of serial data streams to recover the scrambled data; and, (f) descrambling the scrambled data to recover the first data.

9. A method as in claim 8 wherein in step (b) the scrambling is based on the following polynomial factors:

$$S[n]=1+S[n-9]+S[n-11].$$

10. A method as in claim 8 wherein step (d) is performed using binary NRZ modulation.

11. A method as in claim 8 wherein in step (c) the block coding is performed using a 5B/6B code.

12. A method for transmitting first data across a network, the method comprising the steps of:

(a) dividing the first data into a plurality of data streams;

(b) scrambling the first data to produce scrambled data, wherein step (b) is performed on the plurality of data streams into which the first data is divided and wherein step (b) includes independently scrambling each of the plurality of data streams to produce a plurality of scrambled data streams;

(c) serializing and block coding the scrambled data to produce a plurality of serial data streams, wherein step (c) includes independently serializing and block coding the plurality of scrambled data streams to produce the plurality of serial data streams, and wherein in step (c) the scrambled data is block coded before being serialized;

(d) transmitting the plurality of serial data streams across the network;

(e) deserializing and block decoding the plurality of serial data streams to recover the scrambled data; and, (f) descrambling the scrambled data to recover the first data.

13. A method as in claim 12 wherein in step (b) the scrambling is based on the following polynomial factors:

$$S[n]=1+S[n-9]+S[n-11].$$

14. A method as in claim 12 wherein step (d) is performed using binary NRZ modulation.

15. A method as in claim 12 wherein in step (c) the block coding is performed using a 5B/6B code.

\* \* \* \* \*

UNITED STATES PATENT AND TRADEMARK OFFICE
CERTIFICATE OF CORRECTION

PATENT NO. : 5,583,872
DATED : December 10, 1996
INVENTOR(S) : Albrecht et al.

It is certified that error appears in the above-identified patent and that said Letters Patent is hereby corrected as shown below:

Column 22,
Line 57, delete "claim 1" and insert therefor -- claim 4 --

Signed and Sealed this

Twenty-seventh Day of May, 2003

JAMES E. ROGAN
*Director of the United States Patent and Trademark Office*